United States Patent Office 3,255,242
Patented June 7, 1966

3,255,242
(α-ALKYLIDENEACYL)NAPHTHYLOXY MONO-
CARBOXYLIC ACIDS
William A. Bolhofer, Frederick, and James M. Sprague,
Gwynedd Valley, Pa., assignors to Merck & Co., Inc.,
Rahway, N.J., a corporation of New Jersey
No Drawing. Filed Aug. 15, 1963, Ser. No. 302,484
18 Claims. (Cl. 260—520)

This application is a continuation-in-part of application Serial No. 152,137, filed November 14, 1961, now abandoned.

This invention is concerned with (α-alkylideneacyl) naphthalene compounds wherein the naphthalene ring is further linked to an organic carboxylic acid moiety through a divalent atom of Group VI A of the Periodic Table having an atomic weight less than 33 and in which the said naphthalene ring can have at least one additional substituent. The invention also comprises the salts, esters and amides of these compounds. More particularly the invention is concerned with (α-alkylideneacyl)napthalene compounds wherein said organic carboxylic acid moiety is selected from an alkanoic acid or an aromatic carboxylic acid having a 6-membered ring such as benzoic acid or a phenyl alkanoic acid.

This invention more specifically is concerned with (α-alkylideneacyl)naphthyloxy derivatives of monocarboxylic acids wherein the monocarboxylic acid portion thereof is derived from an aliphatic-, aliphatic-aromatic-, or an aromatic-monocarboxylic acid. These compounds can be illustrated by the structural formula:

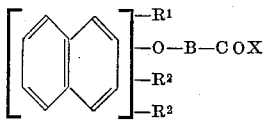

wherein the variable radicals are attached to either or both rings of the naphthalene structure, and wherein $R^1$ and $R^2$ can be the same or different radicals selected from the group consisting of hydrogen, lower alkyl advantageously having from one to five carbon atoms and halogen;

$R^3$ is the α-alkylideneacyl radical advantageously having the structure

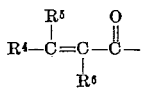

wherein $R^4$, $R^5$, and $R^6$ respectively is selected from the group consisting of hydrogen; halogen or halogen-like radicals; hydroxyl; straight or branched chain, saturated or unsaturated, and unsubstituted or substituted lower aliphatic (or lower aliphatic-oxy) wherein the substituent group or groups can be alkyl, alkoxyl, alkylthio, aralkylthio, arylmercaptoalkyl, alkylsulfonyl, amino, substituted amino, a heterocyclic group particularly piperidyl, pyrrolidyl, piperazinyl, morpholinyl and the like, halogen and halogen-like, carboxyl or substituted carboxyl, cyano, hydroxyl, sulfhydryl, or nitro and the like; and wherein the alphatic group can be attached to the alkylideneacyl radical through a hetero atom especially an oxygen or sulfur atom; alicyclic, either saturated or unsaturated and unsubstituted or substituted as described above for the aliphatic group; aryl or aryloxy, especially phenyl or phenoxy wherein the phenyl moiety can be unsubstituted or a substituent can be attached to one or more of its carbons, said substituent advantageously being selected from a lower straight or branched chain alkyl, a lower alkoxy, a lower alkylthio, hydroxy or a halogen or halogen-like substituent; arylalkyl such as a phenalkyl group, either unsubstituted or substituted as above; nitro; cyano; and wherein $R^4$ and $R^6$ can be linked together to form a 3 to 6 carbon ring, and wherein $R^5$ additionally can be an acyl group;

B is a divalent aliphatic, aromatic or aliphatic-aromatic group, preferably a divalent straight or branched chain lower aliphatic group, a phenyl-lower alkyl or an unsubstituted or substituted phenyl group having from 1 to 4 substituent groups attached to its nucleus which can be the same or different groups selected from the group consisting of hydrogen; halogen or halogen-like radicals; lower straight or branched chain unsubstituted or substituted aliphatic wherein the substituents advantageously are amino, substituted amino, alkoxy, alkylthio, araliphatic or substituted araliphatic; lower aliphatic-oxy either unsubstituted or having a substituent of the type suggested above for the aliphatic group, and wherein the aliphatic-oxy preferably is a lower alkoxy or substituted lower alkoxy as a carboxy-alkoxy; lower aliphatic-thio radicals corresponding to the lower aliphatic-oxy groups described above; an aliphatic sulfonyl as an alkylsulfonyl, arylsulfonyl; hydroxy, nitro; amino; acylamino; alkyl- or dialkylamino and those dialkylamino groups wherein the alkyls are linked together to form a cyclic structure with the nitrogen atom to which they are attached; a carboxy; carbamoyl; N-substituted carbamoyl; unsubstituted or substituted aryl or a heterocyclic group; and X is a hydroxyl group or salts of the resulting acids, i.e., metal salts such as sodium, potassium, calcium salts and the like or an amine salt; alkoxyl or substituted alkoxyl as one substituted with a dialiphatic amino group; an amino group which can have either one or two substituents in place of the hydrogen, thus having the structure $$-NR^7R^8$$

wherein $R^7$ and $R^8$ are the same or different aliphatic or substituted aliphatic groups or hydrogen or R and $R^8$ can be joined together to form a cyclic structure with the nitrogen atom to which they are attached forming a hetero ring containing one or more hetero atoms.

In the above definition, the halogen and halogen-like groups represent chlorine, bromine, iodine, fluorine, halomethyl, especially trichloromethyl, trifluoromethyl and the like.

The compounds of this invention and particularly compounds having the structure illustrated above wherein the radicals —O—B—COX and —$R^3$ are attached to the 1- and 4-positions respectively of the naphthalene nucleus, and particularly those compounds wherein the radicals —O—$CH_2COOH$ and —$R^3$ are attached in the 1- and 4-positions respectively of the naphthalene nucleus and wherein the naphthalene nucleus is otherwise either unsubstituted or mono-halogen substituted or contains a mono-lower aliphatic substituent particularly in the 2-position of the naphthalene nucleus, as well as derivatives thereof or precursors thereof which will generate the α-alkylideneacyl compounds of this invention upon administration, possess diuretic, natriuretic and chloruretic properties, the amount of water, sodium and chloride being increased by approximately an equivalent extent. They are therefore useful in the treatment of many ailments resulting from excessive retention of electrolytes, especially sodium, chloride or sodium and chloride ions, as in the treatment of hypertension, edema and other conditions associated with electrolyte and fluid retention. These compounds also can be used to increase urine flow. Exceptionally good activity in exhibited by [(α-alklidene-acyl)naphthyloxy]acetic acids of the above preferred groups, wherein the α-alkylidene moiety is lower-aliphatic.

Pharmacological studies of the products of this invention demonstrate that they possess the unique property among diuretic agents in that they can cause from two to five times more electrolyte to be excreted than can be caused to be excreted by known diuretic agents. Thus, while any known diuretic agent reaches a threshold or ceiling in the amount of electrolyte it can cause to be excreted (which is not exceeded and may even decrease even when the dose of agent is increased), the compounds of this invention can bring about the excretion of from two to five or more times this ceiling value. This may be explained by reason of the fact that the (naphthyloxy)-acetic acids of this invention do not seem to possess a ceiling saluretic effect as the response increases with the dose, up to the maximum dose that can be administered.

While a single dose of a compound of this invention can cause a very large amount of electrolyte to be excreted, especially when the compound is administered intravenously, the activity of the product decreases rapidly with time. It is thus possible to use the products of this invention to achieve a very rapid and marked removal of electrolytes without danger of excessive electrolyte depletion.

The α-methyleneacylnaphthyloxy derivatives of organic carboxylic acids and especially organic monocarboxylic acids of this invention generally are prepared from a saturated aliphaticacylnaphthol. The acylnaphthol is reacted with an α-halo ester, for example, a haloacetate; and the (acylnaphthyloxy)acetate ester thus obtained is hydrolyzed, advantageously with alkali, to form the (acylnaphthyloxy)acetic acid or other desired acylnaphthyloxy derivative of a monocarboxylic acid. The α-methylene group then is introduced into the acyl moiety of the thus obtained acylnaphthyloxy derivative of the monocarboxylic acid by converting the saturated acyl moiety to a salt of a Mannich base by reaction with a salt of a secondary amine, such as a di-lower alkylamine or cyclic amine, as piperidine, morpholine, and the like advantageously in the presence of formaldehyde or paraformaldehyde. Treatment of the salt of the Mannich base with a weak base such as sodium bicarbonate either with or without heat gives the desired unsaturated acyl compound.

The salts of the Mannich bases prepared by the above procedure are new products and form another feature of this invention. It has been found that many of these Mannich compounds also possess saluretic and diuretic properties.

When the saturated acylnaphthyloxy derivatives of a monocarboxylic acid has two methyl groups and a hydrogen attached to the carbon adjacent to the carbonyl group of the acyl function, the unsaturated acyl group advantageously is formed by brominating the saturated acyl group and then removing hydrogen bromide, thus introducing a double bond, by treatment with dehydrohalogenating agents such as silver acetate or silver fluoride in benzene, or by treatment with lithium chloride in dimethylformamide and the like. If one of the methyl groups in the above starting material is replaced by ethyl or a higher alkyl, unsaturation will occur mainly between said higher alkyl group and the carbon in alpha position to the carbonyl function. When each of the methyl groups in the above saturated acylnaphthyloxy monocarboxylic acid compound is replaced by a higher alkyl group, unsaturation generally will mainly occur between the α-carbon and the alkyl group having the larger number of carbon atoms.

When it is desired to prepare compounds having an unsaturated acyl group of the type

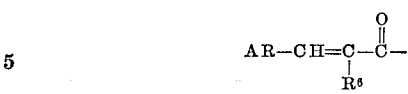

wherein AR is an unsubstituted or substituted aryl (i.e., phenyl) group and $R^6$ is hydrogen or a group of the type herein above included in the definition of $R^6$, these compounds preferably are prepared by condensing benzaldehyde, for example, in an alkaline medium with the saturated acylnaphthyloxy derivative of a monocarboxylic acid, that is, one having the saturated acyl grouping

and then treating the alkaline reaction mixture with acid to separate the unsaturated product.

Many saturated acylnaphthol compounds are described in the literature and many new saturated acylnaphthols can be prepared by one or another of the methods that have been described in the literature for the preparation of compounds having similar acyl groups attached to the naphthol nucleus. The saturated acylnaphthol can, for example, be prepared either from the naphthol itself or from an alkoxynaphthylene compound.

When naphthol or a naphthol having an $R^1$ and/or $R^2$ substituent attached to the naphthalene nucleus is employed as starting material, it can be converted to the saturated acylnaphthol by conversion of the hydroxyl group to a carboxylic ester and then forming the acylnaphthol by the Fries rearrangement with aluminum chloride or similar catalyst, then quenching in acid to give the desired saturated acylnaphthol compound.

An alkoxynaphthalene compound can be converted to the saturated acylnaphthol by reacting the alkoxynaphthylene compound, either with or without a substituent such as represented by $R^1$ and/or $R^2$ above, with the desired saturated aliphatic acid in the presence of boron trifluoride and then cleavage of the alkoxy group by treatment with agents such as pyridine hydrochloride, aluminum chloride and alkylmagnesium halides, advantageously with heating and preferably in the presence of an inert gas.

An alkoxynaphthalene compound also can be converted to the saturated acylnaphthol by the Friedel-Crafts reaction by reacting the alkoxynaphthalene compounds, either with or without a substituent such as represented by $R^1$ and/or $R^2$ above with the desired aliphatic acid chloride in a solvent such as nitrobenzene, carbon disulfide, hexane and the like followed by cleavage of the alkoxy group by treatment with agents such as pyridine hydrochloride, aluminum chloride and alkyl magnesium halides, advantageously with heating and preferably in the presence of an inert gas.

Various other starting materials also can be employed. For example, a cyanonaphthol can be alkylated by treatment with an alkyl sulfate under basic conditions, for example, with sodium or potassium hydroxide, to the corresponding alkoxy derivatives, and then the cyano group can be converted to the desired saturated acyl grouping by treatment with a Grignard reagent followed by acid hydrolysis of the imino intermediate. The alkoxy group then can be cleaved to the hydroxyl group by the method described above.

Similarly an alkoxy substituted naphthalene compound having iodine attached to the naphthalene nucleus can be converted to a saturated acyl compound by replacing the iodide ion by the desired acyl group by treatment with magnesium in the presence of an inert solvent and advantageously with heating and then reacting, in situ, the product formed with an alkylnitrile followed by acid hydrolysis of the imino intermediate. The alkoxy group then can be cleaved to the hydroxyl group by the method described above.

Additionally, an acetamidonaphthalene compound can readily be converted into a saturated acylnaphthylamine by the Friedel-Crafts reaction followed by acid hydrolysis to remove the acetyl group. Diazotization of the resulting product with, for example, nitrites or nitrous acid, and then treatment with sulfuric acid advantageously in the presence of an inert gas, forms the desired saturated acylnaphthol.

If desired the naphthyloxyacetic acid can be employed as starting materials, and the saturated acyl substituent can be introduced into the naphthalene nucleus by the Friedel-Crafts reaction without first proceeding through the naphthol intermediate. There is thus obtained the saturated (acylnaphthyloxy)acetic acid compound which can be treated by the Mannich reaction or brominated and then converted by the methods described above to form the novel compounds of this invention.

It is to be understood that the methods described above as well as those described in the following examples are illustrative of those methods which can be employed and are not to be construed as limiting the invention to the particular methods of the particular compounds specifically described.

EXAMPLE 1.—[5-($a$-METHYLENEBUTYRYL)-1-NAPHTHYLOXY]ACETIC ACID

Step A.—Preparation of 5-methoxy-1-naphthonitrile

To a well-stirred solution of 48.2 g. (0.285 mole) of 5-hydroxy-1-naphthonitrile in 250 ml. of 2 N potassium hydroxide, there is added 26.5 ml. (0.285 mole) of methyl sulfate over a one-minute period. A warming effect is observed and solid product begins to separate. After 5 minutes, additional methyl sulfate (13.3 ml., 0.142 mole) is added, the mixture becomes acidic and additional 2 N potassium hydroxide is added to maintain alkalinity. After 15 minutes the solid product is collected, washed with water and dried. The crystalline product is dissolved in 550 ml. of hot isopropyl ether, the solution filtered and then concentrated to 200 ml. After crystallization at 0° C., 30.0 g. of 5-methoxy-1-naphthonitrile is collected, M.P. 87–89° C.

Analysis.—Calculated for $C_{12}H_9NO$: C, 78.67; H, 4.95; N, 7.65. Found: C, 78.52; H, 4.72; N, 7.85.

Step B.—Preparation of 5-methoxy-1-butyronaphthone

A Grignard reagent is prepared from 0.248 mole of magnesium and 0.248 mole of n-propyl bromide in 325 ml. of ether. To the vigorously stirred, refluxing solution of the Grignard reagent, a solution of 41.2 g. (0.225 mole) of 5-methoxy-1-naphthonitrile in 450 ml. of ether is added over a ten minute period. The reflux condenser is changed for downward distillation and 550 ml. of toluene is added at a rate equal to that of the ether being removed by distillation. After all the toluene has been added, distillation is continued until the vapor temperature reaches 109° C. The downward condenser is replaced by an upright condenser and refluxing continued for four hours. The mixture is cooled to room temperature and 250 ml. of saturated ammonium chloride solution added. The toluene phase is separated and the aqueous phase extracted with ether which is then combined with the toluene. The combined solvent extracts are extracted with 400 and 200 ml. portions of 1 N sulfuric acid. The acid extracts are combined and allowed to stand at 20° C. After 18 hours, crystalline 5-methoxy-1-butyronaphthone is collected, washed with water and dried, yield 46.0 g. After recrystallization from isopropyl ether, the product melts at 67–60° C.

Analysis.—Calculated for $C_{15}H_{16}O_2$: C, 78.92; H, 7.06. Found: C, 78.87; H, 7.00.

Step C.—Preparation of 5-hydroxy-1-butyronaphthone

Ten grams of 5-methoxy-1-butyronaphthone and 30 g. of pyridine hydrochloride are heated at 200–210° C. for 1 hour with stirring in a nitrogen atmosphere. After the reaction cools to 20° C. the cake is dissolved with a mixture of 100 ml. of 1 N hydrochloric acid and 100 ml. of ether. The ether layer is separated, extracted with water and then the naphthol is extracted into 75 ml. of 1 N sodium hydroxide. Dissolved ether is removed from the alkaline solution by bubbling a stream of nitrogen through it. A limited amount of 1 N hydrochloric acid is added to just precipitate the tarry by-products. The mixture then is filtered, the filtrate acidified and the solid material collected and washed with water, yielding 7.4 g. of crystalline 5-hydroxy-1-butyronaphthone, M.P. 83–85° C. After recrystallization from a mixture of benzene and hexane the product melts at 84–86° C.

Analysis.—Calculated for $C_{14}H_{14}O_2$: C, 78.48; H, 6.59. Found: C, 78.76; H, 6.68.

Step D.—Preparation of (5-butyryl-1-napthyloxy)acetic acid 5-hydroxy-1-butyronaphthone (17.7 g., 0.0825 mole) is added to a solution of 0.0867 mole of sodium ethoxide in 250 ml. of ethyl alcohol. A dark solution results to which is added 16.6 g. (0.099 mole) of ethyl bromoacetate. The solution is heated under reflux for three hours and then 115 ml. of 1 N sodium hydroxide is added. Refluxing is continued for 20 minutes and then the ethyl alcohol is removed by vacuum concentration. The residual aqueous solution is treated with decolorizing charcoal. The filtrate is acidified with 1 N hydrochloric acid and the crystalline (5 - butyryl - 1 - naphthyloxy)acetic acid collected, washed with water and dried yielding 19.0 g. of (5-butyryl-1-naphthyloxy)acetic acid. Recrystallization from isopropyl alcohol gives material melting at 156–157.5° C.

Analysis.—Calculated for $C_{16}H_{16}O_4$: C, 70.57; H, 5.92. Found: C, 70.40; H, 6.07.

Step E.—Preparation of [5-($\alpha$-dimethylaminomethylbutyryl)-1-naphthyloxy] acetic acid hydrochloride The following reactants were placed in a 50 ml. round-bottom flask:

| | |
|---|---|
| (5-butyryl-1-naphthloxy)acetic acid | g 2.0 |
| Paraformaldehyde | g 0.32 |
| Dimethylamine hydrochloride | g 0.68 |
| Alcoholic 6 N hydrogen chloride | drops 6 |

The flask is placed in an oil-bath at 115° C. and the mixture stirred intermittently. After 10 minutes the mixture becomes soft and sticky. The flask is then placed under moderate vacuum for 15 seconds and heating continued and the vacuum treatment repeated every five minutes. After approximately 45 minutes of heating, the reaction is complete and heating is discontinued. The cooled mixture is macerated with 25 ml. of acetone and filtered giving 1.8 g. of [5-($\alpha$-dimethylaminomethylbutyryl)-1-naphthyloxy]acetic acid hydrochloride melting at 165–170° C.

Step F.—Preparation of [5($\alpha$-methylenebutyryl)-1-naphthyloxy]acetic acid

A solution of 4.0 g. of [5-($\alpha$-dimethylaminomethylbutyryl)-1-naphthloxy]acetic acid hydrochloride in 400 ml. of water is made alkaline with saturated sodium bicarbonate solution and heated at 80° C. for 20 minutes. The solution is cooled to 20° C. and filtered to remove a small amount of insoluble gummy material. The filtrate then is acidified and crystalline [5-($\alpha$-methylenebutyryl)-1-naphthyloxy]acetic acid collected, washed with water and dried yielding 2.6 g. of product, M.P. 135–140° C. which after recrystallization from ether, melts at 142–145° C.

Analysis.—Calculated for $C_{17}H_{16}O_4$: C, 71.84; H, 5.67. Found: C, 71.64; H, 5.69.

EXAMPLE 2.—[4-(α-BROMOISOVALERYL)-1-NAPHTHLOXY]ACETIC ACID

*Step A.—Preparation of 4-methoxy-1-isovaleronaphthone*

A solution of 158 g. (1 mole) of 1-methoxynaphthalene and 204 g. (2 moles) of isovaleric acid at 0° C. is saturated with boron trifluoride. The dark red mixture then is heated to 75° C. and maintained at that temperature for 6 hours, the reaction mixture then is poured onto a mixture of 500 g. of ice, 500 g. of water and 500 g. of sodium acetate whereupon an oil separates and is extracted with ether. The ethereal extract is dried over sodium sulfate and solvent removed. The residue is distilled under reduced pressure, the distillate solidifies and is recrystallized from hexane yielding 175 g. of 4-methoxy-1-isovaleronaphthone, M.P. 59.5–61.5° C.

*Analysis.*—Calculated for $C_{16}H_{18}O_2$: C, 79.31; H, 7.49. Found: C, 79.02; H, 7.34.

*Step B.—Preparation of 4-hydroxy-1-isovaleronaphthone*

A mixture of 10 g. of 4-methoxy-1-isovaleronaphthone and 20 g. of pyridine hydrochloride is heated at 205° C. for 1 hour. After cooling to 80° C. the mixture is suspended in 200 ml. of 10% hydrochloric acid. A dark oil separates and is extracted with ether and the ethereal solution extracted with 10% aqueous sodium hydroxide. Acidification of the alkaline extract with hydrochloric acid results in the precipitation of a solid which after recrystallization from a 1:1 mixture of benzene and hexane, yields 2 g. of 4-hydroxy-1-isovaleronaphthone, M.P. 133–135° C.

*Analysis.*—Calculated for $C_{15}H_{18}O_2$: C, 78.92; H, 7.06. Found: C, 78.93; H, 7.00.

*Step C.—Preparation of ethyl (4-isovaleryl-1-naphthyloxy)acetate*

4-hydroxy-1-isovaleronaphthone (9.1 g., 0.04 mole) is added to a solution of 130 ml. of absolute ethanol containing 0.048 mole of sodium ethoxide. After stirring for 10 min., 8 g. (0.048 mole) of ethyl bromoacetate is added. After refluxing for 17 hours, the reaction mixture is filtered to remove salt, and the ethanol is then removed under reduced pressure. The residue is crystallized from hexane and yields 8.5 g. of ethyl (4-isovaleryl-1-naphthyloxy)acetate, M.P. 57–59° C.

*Analysis.*—Calculated for $C_{19}H_{22}O_4$: C, 72.59; H, 7.05. Found: C, 72.29; H, 7.00.

*Step D.—Preparation of ethyl[4-(α-bromoisovaleryl)-1-naphthyloxy]acetate*

To a solution of 3.1 g. (0.1 mole) of ethyl (4-isovaleryl-1-naphthyloxy)acetate in 60 ml. of methylene chloride, which is protected from the light, there is added dropwise at −10° C. a solution of 1.6 g. of bromine in 8 ml. of dioxane and 5 ml. of methylene chloride. The solution is allowed to warm to 15° C. over one hour and is then poured into 500 ml. of water. The methylene chloride layer is separated, dried and the solvent removed under reduced pressure. The residue crystallizes on trituration with hexane and on recrystallization from a mixture of benzene and hexane gives 2.3 g. of ethyl [4-(α-bromoisovaleryl)-1-naphthyloxy]acetate, M.P. 122.5–123.5° C.

*Analysis.*—Calculated for $C_{19}H_{21}O_4Br$: C, 58.02; H, 5.38. Found: C, 58.22; H, 5.45.

*Step E.—Preparation of [4-(α-bromoisovaleryl)-1-naphthyloxy]acetic acid*

A suspension of 1 g. of ethyl[4-(α-bromoisovaleryl)-1-naphthyloxy]acetate in 50 ml. concentrated hydrochloric acid and 30 ml. of dioxane is boiled for 45 minutes. The yellow solution then is poured into 200 ml. of water. On cooling, the product crystallizes and after recrystallization from a mixture of benzene and hexane there is obtained 0.85 g. of [4-(α-bromoisovaleryl)-1-naphthyloxy]acetic acid, M.P. 170.5–173° C.

*Analysis.*—Calculated for $C_{17}H_{17}O_4Br$: C, 55.90; H, 4.69. Found: C, 55.54; H, 5.01.

EXAMPLE 3.—[5-METHYL-7-(α-METHYLENEBUTYRYL)-1-NAPHTHYLOXY]ACETIC ACID

*Step A.—Preparation of 8-methoxy-4-methyl-2-butyronaphthone*

A solution of 2.0 g. (0.012 mole) of 1-methoxy-5-methylnaphthalene in 4.0 g. (0.046 mole) of butyric acid is saturated with boron trifluoride at 10° C. The solution is treated by substantially the same method described in Example 2, Step A, yielding 2.62 g. of viscous yellow liquid which is a mixture of 80° of 8-methoxy-4-methyl-2-butyronaphthone and 20% of other isomers.

*Step B.—Preparation of 8-hydroxy-4-methyl-2-butyronaphthone*

A mixture of 5.0 g. (2.021 mole) of the above mixture of isomers and 15.0 g. (0.13 mole) of pyridine hydrochloride is treated substantially as described in Example 1, Step C, to give 2.32 g. of a brown solid which is crude 8-hydroxy-4-methyl-2-butyronaphthone (the other isomers remain in the organic solvent upon treatment with alkali). Recrystallization twice from aqueous isopropyl alcohol gives pure 8-hydroxy-4-methyl-2-butyronaphthone, M.P. 178–180° C.

*Analysis.*—Calculated for $C_{15}H_{16}O_2$: C, 78.92; H, 7.06. Found: C, 78.58; H, 7.35.

*Step C.—Preparation of (5-methyl-7-butyryl-1-naphthyloxy)acetic acid*

8-hydroxy-4-methyl-2-butyronaphthone (1.0 g., 0.0044 mole) is added to a solution of 35 ml. of absolute ethanol containing 0.0053 mole of sodium ethoxide and then 0.88 g. (0.0053 mole) of ethyl bromoacetate is added and the solution is treated in essentially the same manner described in Example 1, Step D, to give 1.04 g. of a brown solid. Repeated crystallization from a mixture of benzene and cyclohexane gives (5-methyl-7-butyryl-1-naphthyloxy) acetic acid in the form of a white solid, M.P. 152.5–154° C.

*Analysis.*—Calculated for $C_{17}H_{18}O_4$: C, 71.31; H, 6.34. Found: C, 71,06; H, 6.47.

*Step D.—Preparation of [5-methyl-7-(α-methylenebutyryl)-1-naphthyloxy]acetic acid*

A mixture of 3.5 g. (0.0122 mole) of (5-methyl-7-butyryl-1-naphthyloxy)acetic acid, 1.05 g. (0.0128 mole) of dimethylamine hydrochloride, 0.40 g. (0.0134 mole) of paraformaldehyde and ½ ml. of glacial acetic acid is heated at 115° C. for 1¼ hrs. with manual stirring and partial evacuation every 15 minutes. A clear glass, which is the salt of the Mannich base, is obtained. The glass is treated in substantially the same manner described in Example 1, Step F, to give 1.3 g. of white crystalline solid. The reaction mixture is recycled twice by the process of Example 1, Step F, and 0.45 g. of additional product is obtained. Recrystallization from a mixture of benzene and hexane gives [5-methyl-7-(α-methylenebutyryl)-1-naphthyloxy]acetic acid as pure compound, M.P. 136.5–138° C.

*Analysis.*—Calculated for $C_{16}H_{18}O_4$: C, 72.46; H, 6.08. Found: C, 72.16; H, 6.31.

EXAMPLE 4.—[8-(α-METHYLENEBUTYRYL)-2-NAPHTHYLOXY]ACETIC ACID

*Step A.—Preparation of 7-amino-1-butyronaphthone hydrochloride*

2-acetamidonaphthalene (18.5 g., 0.1 mole), aluminum chloride 167 g. (0.5 mole) and 400 cc. carbon disulfide are mixed and stirred rapidly with a Hershberg stirrer. The mixture is cooled to 0° C. and 13.3 g. (0.125 mole) butyryl chloride added during 20 minutes. The mixture changes from colorless to yellow and at the end of the addition a gum-oil separates. This mixture is stirred at 0° C. for 3 hours, then stirred 1 hour as the mixture slowly comes to room temperature. After standing at room temperature overnight, hydrogen chloride is expelled by stirring and heating on a steam bath for 1 hour. After cooling to room temperature, the upper carbon disulfide layer is removed and 300 g. of ice added slowly to the stirred residue. After stirring ½ hour, 100 ml. concentrated hydrochloric acid is added and this mixture then is stirred and heated on a steam bath 1½ hours. On cooling, an oil solidifies and is collected by filtration. The thus obtained yellow 7-amino-1-butyronaphthone hydrochloride is triturated twice with isopropyl ether to yield 24 g. (94%), of product, M.P. 163–170° C. One recrystallization from alcohol raises the M.P. to 177–181° C.

*Analysis.*—Calculated for $C_{14}H_{15}NO \cdot HCl$: C, 67.32; H, 6.46; N, 5.61. Found: C, 67.17; H, 6.55; N, 5.55.

*Step B.—Preparation of 7-hydroxy-1-butyronaphthone*

7-amino-1-butyronaphthone hydrochloride (10.0 g., 0.04 mole) is dissolved in a mixture of 10 ml. of glacial acetic acid, 10 ml. of concentrated sulfuric acid and 30 ml. of water. This solution is cooled to 0° C. and 3.3 g. (0.048 mole) of sodium nitrite in 10 ml. of water is added slowly keeping the temperature below 5° C. This diazo solution is left at 0° C. for 15 minutes and then added dropwise over 7 minutes to a stirred, refluxing mixture of 40 ml. of concentrated sulfuric acid and 160 ml. of water in a nitrogen atmosphere. The mixture is stirred and refluxed three minutes and then immediately poured over 400 g. of crushed ice. After 1 hour, the dark gum is repeatedly extracted with portions of boiling hexane which, on cooling, precipitates 3.25 g. (38%) of 7-hydroxy-1-butyronaphthone as yellow rosettes, M.P. 79–83° C. An additional recrystallization (with charcoal) from hexane raises the M.P. to 84–85° C.

*Analysis.*—Calculated for $C_{14}H_{14}O_2$: C, 78.48; H, 6.59. Found: C, 78.49; H, 6.67.

*Step C.—Preparation of (8-butyryl-2-naphthyloxy) acetic acid*

7-hydroxy-1-butyronaphthone (2.14 g., 0.01 mole) is dissolved in 35 ml. of absolute ethanol containing 0.012 mole sodium ethoxide. After this solution has refluxed for 10 minutes, 3.3 g. ethyl bromoacetate (0.02 mole) is added and the solution then is treated by substantially the same method described in Example 1, Step D, to give a precipitated oil which is scratched and solidified to yield 2.6 g. (97%) of (8-butyryl-2-naphthyloxy)-acetic acid as a light yellow solid, M.P. 109–115° C. Recrystallization from a 2:1 mixture of benzene and cyclohexane increases the M.P. to 118–120° C.

*Analysis.*—Calculated for $C_{16}H_{16}O_4$: C, 70.57; H, 5.92. Found: C, 70.83; H, 6.11.

*Step D.—Preparation of [8-(α-methylenebutyryl)-2-naphthyloxy]acetic acid*

(8-butyryl-2-naphthyloxy)acetic acid (2.0 g., 0.0074 mole), paraformaldehyde (0.32 g., 0.0104 mole), dimethylamine hydrochloride (0.68 g., 0.0082 mole), and 6 drops of 6 N alcoholic hydrogen chloride are mixed well and reacted in substantially the same manner described in Example 1, Step E, and the salt of the Mannich base is treated by the method described in Example 1, Step F (without isolating the salt) to yield 1.2 g. (54%) of [8-(α-methylenebutyryl)-2-naphthyloxy]acetic acid, M.P. 111–115° C. Further recrystallizations raise the M.P. to 118–120° C.

*Analysis.*—Calculated for $C_{17}H_{16}O_4$: C, 71.82; H, 5.67. Found: C, 71.99; H, 5.95.

EXAMPLE 5.—[4 - CHLORO - 2-(α-METHYLENEBUTYRYL)-1-NAPHTHYLOXY]ACETIC ACID

*Step A.—Preparation of 4-chloro-1-hydroxy-2-butyronaphthone*

To a solution of 10.7 g. (0.05 mole) of 1-hydroxy-2-butyronaphthone in 200 ml. of glacial acetic acid is added dropwise 5.4 g. (0.05 mole) of tert.-butylhypochlorite. The reaction mixture is held at 100° C. for forty-five minutes and then poured into 300 ml. of water. An oil separates, which solidifies and is removed by filtration. Recrystallization from hexane yields 6.5 g. of 4-chloro-1-hydroxy-2-butyronaphthone, M.P. 59.5–61° C.

*Analysis.*—Calculated for $C_{14}H_{13}ClO_2$: C, 67.61; H, 5.27. Found: C, 67.33; H, 5.36.

*Step B.—Preparation of (4-chloro-2-butyryl-1-naphthyloxy)acetic acid*

A mixture of 8 g. (0.032 mole) of 4-chloro-1-hydroxy-2-butyronaphthone, 10.5 g. (0.076 mole) of potassium carbonate, 6.3 g. (0.038 mole) of ethyl bromoacetate and 100 ml. of N,N-dimethylformamide is stirred at room temperature for 17 hours. Water is added until all the inorganic salts have dissolved and the solution then is extracted with ether. The ether layer is separated and the solvent removed. The resulting dark oil is suspended in 100 ml. of 2 N aqueous potassium hydroxide. The mixture is boiled for forty-five minutes, acidified with hydrochloric acid and extracted with ether. The ether solution is extracted with aqueous sodium bicarbonate, and the bicarbonate extract then is acidified whereupon a solid separates. Recrystallization from a mixture of benzene and hexane yields 4 g. of (4-chloro-2-butyryl-1-naphthyloxy)acetic acid, M.P. 74–76° C.

*Analysis.*—Calculated for $C_{16}H_{15}ClO_4$: C, 62.65; H, 4.93. Found: C, 62.38; H, 5.10.

*Step C.—Preparation of [4 - chloro - 2 - (α - dimethylaminomethylbutyryl) - 1 - naphthyloxy]acetic acid hydrochloride*

A mixture of 2.5 g. (0.008 mole) of (4-chloro-2-butyryl-1-naphthyloxy)acetic acid, 0.36 g. (0.012 mole) of paraformaldehyde, 0.97 g. (0.012 mole) of dimethylamine hydrochloride and seven drops of 6 N ethanolic hydrogen chloride is treated in substantially the same manner described in Example 1, Step E. The reaction mixture obtained is triturated with 5 ml. of isopropyl alcohol and 30 ml. of isopropyl ether to yield 2.8 g. of [4 - chloro - 2 - (α-dimethylaminomethylbutyryl)-1-naphthyloxy]acetic acid hydrochloride, M.P. 155–160° C. The product after recrystallization from an isopropyl alcohol-ether mixture melts at 165–166.5° C.

*Analysis.*—Calculated for $C_{19}H_{22}ClNO_4 \cdot HCl$: C, 57.01; H, 5.79. Found: C, 57.18; H, 5.90.

*Step D.—Preparation of [4-chloro-2-(α-methylenebutyryl)-1-naphthyloxy]acetic acid*

A solution of 4.8 g. (0.012 mole) of [4-chloro-2-(α-dimethylaminomethylbutyryl)-1-naphthyloxy]acetic acid hydrochloride in 50 ml. of water is made alkaline with aqueous sodium bicarbonate solution and treated by substantially the same method described in Example 1, Step F, to give 2.5 g. of [4-chloro-2-(α-methylenebutyryl)-1-naphthyloxy]acetic acid as a yellow oil.

*Analysis.*—Calculated for $C_{17}H_{15}ClO_4$: C, 64.05; H, 4.74. Found: C, 63.99; H, 4.46.

EXAMPLE 6.—[2 - CHLORO - 4-(α-METHYLENEBUTYRYL)-1-NAPHTHYLOXY]ACETIC ACID

*Step A.—Preparation of 3-chloro-4-hydroxy-1-butyronaphthone*

Aluminum chloride, 26.6 g., is added to a mixture of 17.8 g. (0.1 mole) of 2-chloro-1-naphthol, 10.6 g. (0.1 mole) of butyryl chloride and 200 ml. of nitrobenzene. The resulting black solution is allowed to stir for 20 hours at room temperature and the reaction mixture then is poured onto a mixture of 100 g. of ice, 100 g. of water and 100 g. of concentrated hydrochloric acid. The organic layer is diluted with 200 ml. of ether, separated from the aqueous layer, and then extracted with 20% aqueous sodium hydroxide. Acidification of the alkaline extract yields a dark solid which, after recrystallization from a mixture of benzene and hexane gives 5.5 g. of 3-chloro-4-hydroxy-1-butyronaphthone, M.P. 111–113° C.

*Analysis.*—Calculated for $C_{14}H_{13}ClO_2$: C, 67.61; H, 5.27. Found: C, 67.79; H, 5.38.

*Step B.—Preparation of (2-chloro-4-butyryl-1-naphthyloxy)acetic acid*

To a solution of 5 g. (0.02 mole) of 3-chloro-4-hydroxy-1-butyronaphthone in 100 ml. of absolute ethanol there is added 0.22 mole of sodium hydride. After stirring for ten minutes, 3.33 g. (0.022 mole) of ethyl bromoacetate is added to the clear solution and the reaction mixture is treated in substantially the same manner described in Example 1, Step D, whereupon the product precipitates. After recrystallization from benzene, 3 g. of (2-chloro-4-butyryl-1-naphthyloxy)acetic acid is obtained, M.P. 124–125° C.

*Analysis.*—Calculated for $C_{16}H_{13}ClO_4$: C, 62.65; H, 4.93. Found: C, 62.77; H, 5.02.

*Step C.—Preparation of [2-chloro-4-(α-methylenebutyryl)-1-naphthyloxy]acetic acid*

A mixture of 3.3 g. (0.011 mole) of (2-chloro-4-butyryl-1-naphthyloxy)acetic acid, 0.45 g. (0.015 mole) of paraformaldehyde, 1.2 g. (0.015 mole) of dimethylamine hydrochloride and 7 drops of 6 N ethanolic hydrogen chloride are reacted by substantially the same method described in Example 1, Step E, to give 4.2 g. of crude [2 - chloro - 4(α - dimethylaminomethylbutyryl-1-naphthyloxy]acetic acid hydrochloride. A solution of 5.6 g. of this crude salt of the Mannich base in 150 ml. of water is made alkaline with sodium bicarbonate and treated by essentially the same procedure described in Example 1, Step F. The resulting residue, after crystallization from a mixture of benzene and hexane, yields 1.75 g. of [2-chloro-4-(α-methylenebutyryl)-1-naphthyloxy]acetic acid, M.P. 100–101.5° C.

*Analysis.*—Calculated for $C_{17}H_{15}ClO_4$: C, 64.05; H, 4.74. Found: C, 63.94; H, 4.69.

EXAMPLE 7.—[5-(α-METHYLENEBUTYRYL)-2-NAPHTHYLOXY]ACETIC ACID

*Step A.—Preparation of 6-methoxy-1-butyronaphthone*

In a 2 liter three-necked flask fitted with a stirrer, reflux condenser, drying tube, dropping funnel and heating mantle, there is placed 19.5 g. (0.8 mole) of magnesium turnings. Fifty ml. of ether, a crystal of iodine and 1 ml. of ethylene dibromide then are added. As soon as the vigorous reaction begins, a solution of 114 g. (0.4 mole) of 6-methoxy-1-iodo-naphthalene in 570 ml. of anhydrous ether is added over a 40 minute period. The mixture then is heated under reflux with stirring for one hour and then a solution of 55.2 g. (0.8 mole) of butyronitrile in 300 ml. of ether is added over a 45 minute period and refluxing and stirring continued for 3 hours. The reaction then is cooled to 10° C. and 500 ml. of ammonium chloride solution added. After vigorous agitation, the ether layer is separated and extracted with a 600 ml. and two 200 ml. portions of 1 N sulfuric acid. The acid extracts are combined and heated at 80° C. for one hour whereupon an oily product separates and is extracted into ether. The ether solution is washed with water, dried with sodium sulfate and then concentrated in vacuo to give 54 g. of 6-methoxy-1-butyronaphthone as a light yellow oil, $n_D^{25}$ 1.6010, which is purified by evaporative distillation at 140–145° C. and 0.05 mm. pressure.

*Analysis.*—Calculated for $C_{15}H_{16}O_2$: C, 78.92; H, 7.05. Found: C, 79.06; H, 7.07.

*Step B.—Preparation of 6-hydroxy-1-butyronaphthone*

Eight grams of 6-methoxybutyronaphthone and 24 grams of pyridine hydrochloride are treated by substantially the same method described in Step C of Example 1 to give 7.0 g. of 6-hydroxy-1-butyronaphthone. Recrystallization of the product from n-butyl chloride gives material melting at 83–84° C.

*Analysis.*—Calculated for $C_{14}H_{14}O_2$: C, 78.48; H, 6.59. Found: C, 78.14; H, 6.73.

*Step C.—Preparation of (5-butyryl-2-naphthyloxy)acetic acid*

6-hydroxy-1-butyronaphthone (19.3 g., 0.09 mole) is added to a solution of 0.095 mole of sodium ethoxide in 300 ml. of ethyl alcohol. A clear solution results to which is added 18.03 g. (0.108 mole) of ethyl bromoacetate. The solution is treated by substantially the same method described in Example 1, Step D. The product obtained is recrystallized from benzene to provide 17.2 g. of (5-butyryl-2-naphthyloxy)acetic acid, M.P. 113–115° C.

*Analysis.*—Calculated for $C_{16}H_{16}O_4$: C, 70.57; H, 5.92. Found: C, 70.62; H, 6.06.

*Step D.—Preparation of [5-(α-dimethylaminomethylbutyryl)-2-naphthyloxy]acetic acid hydrochloride*

The following reactants are placed in a 50 ml. round-bottom flask:

(5-butyryl-2-naphthyloxy)acetic acid, g. _____ 4.0
Paraformaldehyde, g. _____ 0.64
Dimethylamine hydrochloride, g. _____ 1.36
Alcoholic 6 N hydrogen chloride, drops _____ 12 and treated by substantially the same method described in Example 1, Step E, to form [5-(α-dimethylaminomethylbutyryl)-2-naphthyloxy]acetic acid hydrochloride in the form of a glass.

*Step E.—Preparation of [5-(α-methylenebutyryl-2-naphthyloxy]acetic acid*

The [5 - (α-dimethylaminomethylbutyryl)-2-naphthyloxy]acetic acid hydrochloride obtained as described above is dissolved in 250 ml. of 0.05 N hydrochloric acid and some insoluble material removed by filtration. The filtrate is made alkaline with saturated sodium bicarbonate solution and then treated by essentially the same method described in Example 1, Step F. The product obtained is recrystallized from 10 ml. of carbon tetrachloride and then triturated with 5 ml. of a 50:50 mixture of isopropyl ether and carbon tetrachloride to give 1.47 g. of [5-(α-methylenebutyryl)-2-naphthyloxy]acetic acid melting at 101–103° C.

*Analysis.*—Calculated for $C_{17}H_{16}O_4$: C, 71.81; H, 5.67. Found: C, 71.65; H, 5.54.

EXAMPLE 8. — [2-METHYL-4-(α-METHYLENEBUTYRYL)-1-NAPHTHYLOXY]ACETIC ACID

*Step A.—Preparation of (2-methyl-1-naphthyloxy)acetic acid*

2-methyl-1-naphthol (10.0 g., 0.063 mole) is dissolved in 200 cc. absolute ethyl alcohol containing 0.0788 mole of sodium ethoxide and the solution treated by substantially the same method described in Example 1, Step D. The brown oil which separates soon solidifies and after recrystallization from 100 ml. benzene, gives 10.0 g. of (2-methyl-1-naphthyloxy)acetic acid, M.P. 141–143° C.

*Analysis.*—Calculated for $C_{13}H_{12}O_3$: C, 72.21; H, 5.59. Found: C, 72.29; H, 5.60.

*Step B.—Preparation of (2-methyl-4-butyryl-1-naphthyloxy)acetic acid*

(2 - methyl - 1 - naphthyloxy)acetic acid (6.5 g., 0.03 mole) is dissolved in 60 ml. of carbon disulfide. This solution is stirred and 12.0 g. (0.09 mole) aluminum chloride is added and then 3.5 g. (0.033 mole) butyryl chloride is added. The mixture is stirred at room temperature for 1 hour, then stirred under reflux 3 hours. After cooling to room temperature, 50 ml. of a mixture of ice and water is added and then acidified with 2½ N hydrochloric acid. The oily product is extracted into ether. The ethereal solution is dried over sodium sulfate and filtered through Filter-Cel and charcoal, then concentrated, yielding 8.7 g. of a red oil. The oil is dissolved in 30 ml. of a 1:1 mixture of benzene-cyclohexane and cooled to yield 5.1 g. of a light pink solid, M.P. 114–117° C. Recrystallization from benzene gives (2-methyl-4-butyryl-1-naphthyloxy)acetic acid, M.P. 116–119° C.

*Analysis.*—Calculated for $C_{17}H_{18}O_4$: C, 71.31; H, 6.34. Found: C, 71.34; H, 6.25.

*Step C.—Preparation of [2-methyl-4-(α-dimethylaminomethylbutyryl)-1-naphthyloxy]acetic acid hydrochloride*

(2-methyl-4-butyryl-1-naphthyloxy)acetic acid (5.0 g., 0.0175 mole), paraformaldehyde (0.75 g., 0.025 mole), dimethylamine hydrochloride (1.55 g., 0.0193 mole) and 6 drops of 6 N alcoholic hydrogen chloride are mixed well and treated by substantially the same method described in Example 1, Step E. The solid which precipitates is collected yielding 3.75 g. of product, M.P. 165–169° C. After recrystallization from isopropyl alcohol, the [2-methyl-4-(α-dimethylaminomethylbutyryl)-1-naphthyloxy]acetic acid hydrochloride melts at 171–173° C.

*Analysis.*—Calculated for $C_{20}H_{25}NO_4 \cdot HCl$: C, 63.23; H, 6.90; N, 3.69. Found: C, 63.40; H, 7.05; N, 3.48.

*Step D.—Preparation of [2-methyl-4-(α-methylenebutyryl)-1-naphthyloxy]acetic acid*

To a suspension of 2.7 g. (0.0087 mole) of [2-methyl-4-(α-dimethylaminomethylbutyryl)-1-naphthyloxy]acetic acid hydrochloride in 75 ml. of water is added saturated sodium bicarbonate until a pH of 8 is attained. The solution then is treated by essentially the same method described in Example 1, Step F, to give 1.95 g. of [2-methyl-4-(α-methylenebutyryl)-1-naphthyloxy]acetic acid, M.P. 65–60° C. Recrystallization from a mixture of benzene and hexane raises the M.P. to 72–74.5° C.

*Analysis.*—Calculated for $C_{18}H_{18}O_4$: C, 72.46; H, 6.08. Found: C, 72.53; H, 6.22.

EXAMPLE 9.—(6-METHACRYLOYL-2-NAPHTHYLOXY)ACETIC ACID

*Step A.—Preparation of (6-propionyl-2-naphthyloxy)acetic acid*

Three grams (0.015 mole) of 6-hydroxy-2-propionaphthone is dissolved in 100 ml. of warm isopropyl alcohol and to this clear solution is added 0.019 mole sodium hydride and then 0.019 mole ethyl bromoacetate. This solution then is treated by substantially the same method described in Example 1, Step D, to give (6-propionyl-2-naphthyloxy)acetic acid which is collected by filtration, washed with water and dried. After recrystallization from alcohol, the product melts at 175–177° C.

*Analysis.*—Calculated for $C_{15}H_{14}O_4$: C, 69.75; H, 5.46. Found: C, 69.45; H, 5.62.

*Step B.—Preparation of [6-(α-methyl-β-dimethylaminopropionyl)-2-naphthyloxy]acetic acid hydrochloride*

Paraformaldehyde (0.17 g., 0.0055 mole), dimethylamine hydrochloride (0.42 g., 0.0052 mole) and 1.35 g. (0.0052 mole) of (6-propionyl-2-naphthyloxy)acetic acid are mixed well in a 100 ml. flask and then 2 drops of glacial acetic acid is added. This mixture is treated by substantially the same method described in Example 1, Step E. The resulting dark mixture is cooled and triturated with isopropyl alcohol to yield 0.7 g. of [6-(α-methyl-β-dimethylaminopropionyl)-2-naphthyloxy]acetic acid hydrochloride, M.P. 166–170° C.

*Step C.—Preparation of (6-methacryloyl-2-naphthyloxy)acetic acid*

[6-(α-methyl-β-dimethylaminopropionyl)-2-naphthyloxy]acetic acid hydrochloride (0.7 g., 0.002 mole) is dissolved in 50 ml. warm water and aqueous sodium bicarbonate is added to pH 8. This solution is treated by essentially the same method described in Example 1, Step F. The precipitate is collected by filtration, dried and recrystallized from benzene to yield 0.34 g. of (6-methacryloyl-2-naphthyloxy)acetic acid, M.P. 145–146° C.

*Analysis.*—Calculated for $C_{16}H_{14}O_4$: C, 71.10; H, 5.22. Found: C, 71.28; H, 5.11.

EXAMPLE 10.—4-METHACRYLOYL-1-NAPHTHYLOXY)ACETIC ACID

*Step A.—Preparation of (4-propionyl-1-naphthyloxy)acetic acid*

To 300 ml. of isopropyl alcohol there is added 0.11 mole of sodium hydride and then 20.0 g. (0.1 mole) of 4-hydroxy-1-propionaphthone. A homogeneous solution results to which is added 18.37 g. (0.11 mole) of ethyl bromoacetate and the reaction is carried out in substantially the same manner as described in Example 1, Step D, to yield 7.6 g. of (4-propionyl-1-naphthyloxy)acetic acid, M.P. 189–191° C. Recrystallization from isopropyl alcohol raises the M.P. to 190–193° C.

*Analysis.*—Calculated for $C_{15}H_{14}O_4$: C, 69.75; H, 5.46. Found: C, 69.32; H, 5.69.

*Step B.—Preparation of [4-(α-methyl-β-dimethylaminopropionyl)-1-naphthyloxy]acetic acid hydrochloride*

A mixture of the following reactants:

| | |
|---|---|
| (4-propionyl-1-naphthyloxy)acetic acid, g. | 4.0 |
| Paraformaldehyde, g. | 0.48 |
| Dimethylamine hydrochloride, g. | 1.26 |
| Glacial acetic acid, drops | 12 | in a 50 ml. flask is treated by substantially the same method described in Example 1, Step E, to give 4.7 g. of [4-(α-methyl-β-dimethylaminopropionyl)-1-naphthyloxy]acetic acid hydrochloride which, after recrystallization from alcohol, melts at 177–179° C.

*Analysis.*—Calculated for $C_{18}H_{21}NO_4 \cdot HCl$: C, 61.44; H, 6.30; N, 3.98. Found: C, 61.47; H, 6.42; N, 3.90.

*Step C.—Preparation of (4-methacryloyl-1-naphthyloxy)acetic acid*

Eight grams of [4-(α-methyl-β-dimethylaminopropionyl)-1-naphthyloxy]acetic acid hydrochloride is dissolved in 400 ml. of water. The solution is made alkaline with sodium bicarbonate and then treated in essentially the same manner described in Example 1, Step F, yielding a gummy product which separates. The supernatant liquid is decanted and the product dissolved in 10 ml. of hot benzene. On cooling to 0° C., a crystalline product separates weighing 2.3 g. and melting at 117–119° C. Recrystallization from hot n-butyl chloride yields 2.0 g. of (4-methacryloyl-1-naphthyloxy)acetic acid melting at 117–120° C. and also at 133–135° C.

*Analysis.*—Calculated for $C_{16}H_{14}O_4$: C, 71.10; H, 5.22. Found: C, 70.90; H, 5.38.

EXAMPLE 11.—[4-(α-METHYLENEBUTYRYL)-1-NAPHTHYLOXY]ACETIC ACID

*Step A.—Preparation of (4-butyryl-1-naphthyloxy)acetic acid*

To a solution of 27.2 g. (0.134 mole)(1-naphthyloxy)acetic acid in 200 ml. carbon disulfide is added 15.8 g. (0.148 mole) n-butyryl chloride. The solution is cooled to 0° C. and 50.8 g. (0.38 mole) aluminum chloride (anhydrous) is added over 15 minutes and the reaction then carried out in substantially the same manner described in Example 8, Step B. The solid precipitate is obtained, filtered and washed well with water. The solid, (4-butyryl-1-naphthyloxy)acetic acid is dissolved in 300 ml. benzene and filtered through Filter-Cel and charcoal and cooled and collected to yield 37 g. of a yellow solid, M.P. 125–132° C. After recrystallization from 75% alcohol, the (4-butyryl-1-naphthyloxy)acetic acid melts at 137–139° C.

*Analysis.*—Calculated for $C_{16}H_{16}O_4$: C, 70.57; H, 5.92. Found: C, 70.41; H, 6.03.

*Step B.*—*Preparation of [4-(α-dimethylaminomethylbutyryl)-1-naphthyloxy]acetic acid hydrochloride*

Paraformaldehyde (0.31 g., 0.0103 mole), dimethylamine hydrochloride (0.84 g., 0.0103 mole) and (4-butyryl-1-naphthyloxy)acetic acid (2.0 g., 0.00735 mole) are mixed well in a 50 ml. round-bottomed flask and 5 drops of 6 N ethanolic hydrogen chloride added. This mixture is treated by substantially the same method described in Example 1, Step E, to form 2.0 g. of white solid, M.P. 172–177° C. One recrystallization from ethyl alcohol gives pure [4-(α-dimethylaminomethylbutyryl)-1-naphthyloxy]acetic acid hydrochloride, M.P. 176–178° C.

*Analysis.*—Calculated for $C_{18}H_{23}NO_4 \cdot HCl$: C, 62.37; H, 6.61; N, 3.83. Found: C, 62.34; H, 6.65; N, 3.78.

*Step C.*—*Preparation of [4-(α-methylenebutyryl)-1-naphthyloxy]acetic acid*

[4-(α-dimethylaminomethylbutyryl) - 1 - naphthyloxy] acetic acid hydrochloride (1.0 g., 0.003 mole) is dissolved in 25 ml. of warm water and a saturated sodium bicarbonate solution added until pH 8 is attained (approximately 2 ml.). This clear solution is treated by substantially the same method described in Example 1, Step F, yielding 0.15 g. of white solid, M.P. 103–107° C. Recrystallization from n-butyl chloride raises the melting point of the [4-(α-methylenebutyryl)-1-naphthyloxy] acetic acid to 106–109° C.

*Analysis.*—Calculated for $C_{17}H_{16}O_4$: C, 71.82; H, 5.67. Found: C, 71.80; H, 5.81.

EXAMPLE 12.—[4-(α-ETHYLIDENEBUTYRYL)-1-NAPHTHYLOXY]ACETIC ACID

*Step A.*—*Preparation of [4-(α-ethylbutyryl)-1-naphthyloxy]acetic acid*

To a well stirred, cooled mixture of 25.2 g. (0.125 mole) of (1-naphthyloxy)acetic acid and 16.7 g. (0.14 mole) of α-ethylbutyryl chloride in 500 ml. of carbon disulfide, there is added 53.2 g. (0.4 mole) of aluminum chloride. The mixture is treated by substantially the same method described in Example 8, Step B, to give a solid which separates and upon recrystallization from a mixture of benzene and hexane yields 12 g. of [4-(α-ethylbutyryl)-1-naphthyloxy]acetic acid, (M.P. 111.5–112.5° C.).

*Analysis.*—Calculated for $C_{18}H_{20}O_4$: C, 71.98; H, 6.71. Found: C, 71.90; H, 6.75.

*Step B.*—*Preparation of [4-(α-bromo-α-ethylbutyryl)-1-naphthyloxy]acetic acid*

A solution of 12 g. (0.04 mole) of [4-(α-ethylbutyryl)-1-naphthyloxy]acetic acid in 100 ml. of glacial acetic acid is cooled to 10° C. and 6.4 g. (0.04 mole) of bromine in 10 ml. of acetic acid is added dropwise. The solution is allowed to warm to room temperature over one hour, and 100 ml. of water is added. A solid precipitates and is removed by filtration. Recrystallization from n-butyl chloride and from a mixture of benzene and hexane yields 8 g. of [4-(α-bromo-α-ethylbutyryl)-1- naphthyloxy] acetic acid, M.P. 134.5–135.5° C.

*Analysis.*—Calculated for $C_{18}H_{19}BrO_4$: C, 57.00; H, 5.05. Found: C, 57.22; H, 4.83.

*Step C.*—*Preparation of [4-(α-ethylidenebutyryl)-1-naphthyloxy]acetic acid*

A mixture of 5 g. (0.013 mole) of [4-(α-bromo-α-ethylbutyryl)-1-naphthyloxy]acetic acid and 1.6 g. (0.042 mole) of lithium chloride in 50 ml. of N,N-dimethylformamide is heated on a steam bath for 2 hours. The solution is poured into 100 ml. of water; an oil separates and is extracted with ether. The ether is removed and crystallization of the residue from n-butyl chloride yields 1.7 g. of [4-(α-ethylidenebutyryl)-1-naphthyloxy]acetic acid, M.P. 132–133.5° C.

*Analysis.*—Calculated for $C_{18}H_{18}O_4$: C, 72.46; H, 6.08. Found: C, 72.20; H, 6.23.

EXAMPLE 13.—[4-(α-METHYLENEBUTYRYL)-2-NAPHTHYLOXY]ACETIC ACID

*Step A.*—*Preparation of 3-methoxy-1-butyronaphthone*

A Grignard reagent is prepared from 1.85 g. (0.076 mole) magnesium turnings and 9.4 g. (0.076 mole) n-propyl bromide in 100 ml. absolute ether. After the reagent had refluxed and stirred for 1 hour, 3-methoxy-1-cyanonaphthalene (11.6 g., 0.0635 mole) dissolved in 500 ml. ether is added slowly. The reaction of these materials is carried out substantially as described in Example 1, Step B, to yield 8.3 g. of 3-methoxy-1- butyronaphthone as a brown oil, $n_D^{20}$ 1.5980. An evaporative distillation produces a slightly yellow oil sample for analysis with an evaporative boiling point of 140° C. at 0.1 mm. pressure, $n_D^{20}$ 1.5986.

*Analysis.*—Calculated for $C_{15}H_{16}O_2$: C, 78.92; H, 7.06. Found: C, 78.94; H, 6.98.

*Step B.*—*Preparation of 3-hydroxy-1-butyronaphthone*

Pyridine (40 ml., 0.5 mole) and concentrated hydrochloric acid (44 ml., 0.5 mole) are cautiously mixed in a round-bottomed flask and heated to 210° C. in a metal bath. To this molten anhydrous pyridine hydrochloride is added 11.8 g. (0.052 mole) of 3-methoxy-1-butyronaphthone and the solution then treated by substantially the same method as described in Example 1, Step C, to yield 8.9 g. of 3-hydroxy-1-butyronaphthone, M.P. 115–118° C. Recrystallization from n-butyl chloride yields white flakes, M.P. 120–122° C.

*Analysis.*—Calculated for $C_{14}H_{14}O_2$: C, 78.48; H, 6.59. Found: C, 78.49; H, 6.63.

*Step C.*—*Preparation of (4-butyryl-2-naphthyloxy)acetic acid*

3-hydroxyl-1-butyronaphthone (8.35 g., 0.039 mole) is dissolved in 100 ml. absolute ethyl alcohol containing 0.043 mole sodium ethoxide. The mixture is heated and stirred for 5 minutes. Then 7.4 g. (0.044 mole) of ethyl bromoacetate is added and the reaction then is carried out by substantially the same method described in Example 1, Step D, to yield 9.5 g. of (4-butyryl-2-naphthyloxy)-acetic acid, M.P. 111–116° C. Recrystallization from benzene, then isopropyl alcohol yields an analytical sample with M.P. 122–124° C.

*Analysis.*—Calculated for $C_{16}H_{16}O_4$: C, 70.57; H, 5.92. Found: C, 70.26; H, 5.97.

*Step D.*—*Preparation of [4-(α-dimethylaminomethylbutyryl)-2-naphthyloxy]acetic acid hydrochloride*

(4-butyryl-2-naphthyloxy)acetic acid (0.5 g., 0.0018 mole), 0.17 g. (0.002 mole) dimethylamine hydrochloride and 0.08 g. (0.0026 mole) paraformaldehyde are intimately mixed in a small, round-bottomed flask. Three drops of glacial acetic acid are added and the mixture then is treated by substantially the same method described in Example 1, Step E. The white, crystalline [4-(α-dimethylaminomethylbutyryl) - 2 - naphthyloxy]acetic acid hydrochloride is collected, yield 0.12 g., M.P. 162–166° C.

*Step E.*—*Preparation of [4-(α-methylenebutyrl)-2-naphthyloxy]acetic acid*

A water solution of the salt of the Mannich base obtained in the foregoing step is made basic to pH 8 with saturated sodium bicarbonate and then treated by substantially the same method described in Example 1, Step F. The oily residue obtained is crystallized from n-butyl chloride to yield [4-(α-methylenebutyryl)-2-naphthyloxy]acetic acid, M.P. 92–94° C. A sample of the [4-(α-methylenebutyryl)-2-naphthyloxy]acetic acid, upon recrystallization from n-butyl chloride for an analytical sample, melts at 96–98.5° C.

*Analysis.*—Calculated for $C_{17}H_{16}O_4$: C, 71.82; H, 5.67. Found: C, 71.50; H, 5.92.

EXAMPLE 14.—[6-(α-METHYLENEBUTYRYL)-1-NAPHTHYLOXY]ACETIC ACID

*Step A.—Preparation of 5-methoxy-2-butyronaphthone*

A Grignard reagent is prepared from 18.5 g. (0.15 mole) n-propyl bromide, 3.6 g. (0.15 mole) magnesium turnings and a trace of iodine in 175 ml. ether. This reagent is stirred and refluxed for 1 hour. Then 22.0 g. (0.12 mole) 5-methoxy-2-cyanonaphthalene in 400 ml. ether is added over 1 hour. The reaction mixture then is treated by substantially the same method described in Example 1, Step B, to give 5-methoxy-2-butyronaphthone in the form of yellow crystals weighing 19 g., M.P. 56–61° C. A recrystallization from isopropyl alcohol raises the M.P. to 60–63° C.

*Analysis.*—Calculated for $C_{15}H_{16}O_2$: C, 78.92; H, 7.06. Found: C, 79.15; H, 7.11.

*Step B.—Preparation of 5-hydroxy-2-butyronaphthone*

The dehydration of aqueous pyridine hydrochloride to anhydrous pyridine hydrochloride for this demethylation is accomplished by heating 64 ml. (0.8 mole) pyridine and 70 ml. (0.8 mole) concentrated hydrochloric acid to 210° C. over approximately ½ hour. To this hot melt is added 19.0 g. (0.084 mole) 5-methoxy-2-butyronaphthone and the resulting dark homogeneous solution then is treated by substantially the same method described in Example 1, Step C, to give 14 g. of 5-hydroxy-2-butyronaphthone weighing 14 g., M.P. 135–137° C. Recrystallization from n-butyl chloride raises the M.P. to 138–140° C.

*Analysis.*—Calculated for $C_{14}H_{14}O_2$: C, 78.48; H, 6.59. Found: C, 78.18; H, 6.82.

*Step C.—Preparation of (6-butyryl-1-naphthyloxy)acetic acid*

5-hydroxy-2-butyronaphthone (13.8 g., 0.065 mole) is dissolved in 200 ml. absolute ethyl alcohol containing 0.078 mole sodium ethoxide. This mixture is refluxed 10 minutes, then 21.7 g. (0.13 mole) ethyl bromoacetate is added and the mixture treated by substantially the same method described in Example 1, Step D, to give a solid which, after recrystallization from 50 ml. of a 50% mixture of ethanol and water, yields 5.8 g. of (6-butyryl-1-naphthyloxy)acetic acid, M.P. 130–133° C. One recrystallization from benzene raises the M.P. to 134–136° C.

*Analysis.*—Calculated for $C_{16}H_{16}O_4$: C, 70.57; H, 5.92. Found: C, 70.46; H, 5.78.

*Step D.—Preparation of [6-(α-dimethylaminomethylbutyryl)-1-naphthyloxy]acetic acid hydrochloride*

An intimate mixture of 1.0 g. (0.0037 mole) (6-butyryl-1-naphthyloxy)acetic acid, 0.16 g. (0.0052 mole) paraformaldehyde, 0.34 g. (0.0041 mole) dimethylamine hydrochloride and six drops of glacial acetic acid are reacted together by substantially the same method described in Example 1, Step E. The solid salt of the Mannich base obtained then is triturated with boiling isopropyl alcohol, cooled and filtered to yield 1.0 g. of [6-(α-dimethylaminomethylbutyryl)-1-naphthyloxy]acetic acid hydrochloride, M. P. 177–183° C.

*Step E.—Preparation of [6-(α-methylenebutyryl)-1-naphthyloxy]acetic acid*

[6-(α-dimethylaminomethylbutyryl) - 1 - naphthyloxy]-acetic acid hydrochloride (1.0 g., 0.003 mole) is dissolved in 25 cc. water to give a slightly cloudy solution which is cleared by passing through a filter aid. The colorless solution is made basic to pH 8 with saturated sodium bicarbonate and treated by substantially the same method described in Example 1, Step F, to yield 0.65 g. of [6-(α-methylenebutyryl)-1-naphthyloxy]acetic acid, M.P. 110–112° C.

*Analysis.*—Calculated for $C_{17}H_{16}O_4$: C, 71.82; H, 5.67. Found: C, 72.05; H, 5.82.

EXAMPLE 15.—[5-CHLORO-4-(α-METHYLENEBUTYRYL)-1-NAPHTHYLOXY]ACETIC ACID

*Step A.—Preparation of (5-chloro-1-naphthyloxy) acetic acid*

To a solution of 16 g. (0.09 mole) of 5-chloro-1-naphthol in 200 ml. of absolute ethanol containing 0.11 mole of sodium ethoxide, there is added, after stirring for five minutes, 18.3 g. (0.11 mole) of ethyl bromoacetate, and the reaction mixture then is treated by substantially the same method described in Example 1, Step D, to give (5-chloro-1-naphthyloxy)acetic acid which, after recrystallization from a mixture of benzene and methanol, melts at 170–181° C., yield 14.7 g.

*Analysis.*—Calculated for $C_{12}H_9ClO_3$: C, 60.90; H, 3.83. Found: C, 61.16; H, 4.02.

*Step B.—Preparation of (5-chloro-4-butyryl-1-naphthyloxy)acetic acid*

Aluminum chloride (24.6 g., 0.18 mole) is added slowly to a well stirred mixture of 12.3 g. (0.05 mole) of (5-chloro-1-naphthyloxy)acetic acid, 6.3 g. (0.06 mole) of butyryl chloride and 300 ml. of carbon disulfide. The reaction mixture is treated by substantially the same method as described in Example 8, Step B, to give a solid, which, after recrystallization from a mixture of benzene and methanol, yields 12.4 g. of (5-chloro-4-butyryl-1-naphthyloxy)acetic acid, M.P. 164–165.5° C.

*Analysis.*—Calculated for $C_{16}H_{15}ClO_4$: C, 62.65; H, 4.93. Found: C, 62.75; H, 4.93.

*Step C.—Preparation of [5-chloro-4-(α-methylenebutyryl)-1-naphthyloxy]acetic acid*

A mixture of 2.4 g. (0.008 mole) of (5-chloro-4-butyryl-1-naphthyloxy)acetic acid, 0.36 g. (0.012 mole) of paraformaldehyde, 0.96 g. (0.012 mole) of dimethylamine hydrochloride and 7 drops of 6 N ethanolic hydrogen chloride is treated by substantially the same method described in Example 1, Step E, to form the hydrochloride salt of the Mannich base. The crude product is triturated with ether, dissolved in 100 ml. of water and the solution made basic with aqueous sodium bicarbonate and then treated by essentially the same method described in Example 1, Step F. The gum which separates is crystallized from benzene yielding 1 g. of [5-chloro-4-(α-methylenebutyryl)-1-naphthyloxy]acetic acid, M.P. 178–179° C.

*Analysis.*—Calculated for $C_{17}H_{15}ClO_4$: C, 64.05; H, 4.79. Found: C, 63.80; H 4.70.

EXAMPLE 16.—[3-METHYL-6(7)-(α-METHYLENEBUTYRYL)-1-NAPHTHYLOXY]ACETIC ACID

*Step A.—Preparation of 1-methoxy-3-methylnaphthalene*

A solution of 5.0 g. (0.0316 mole) of 3-methyl-1-naphthol in 14 ml. of 2.5 N sodium hydroxide and 15 ml. of water is warmed to 40° C. under nitrogen and 3.98 g. (0.0316 mole) of dimethyl sulfate is added over a 10 minute period with stirring. The reaction mixture then is treated by substantially the same method described in Example 1, Step A. The oily product obtained is extracted with ether, washed with water, dried and concentrated under reduced pressure, giving 1-methoxy-3-methylnaphthylene which distills at 95–97° C. at 0.5 mm., yield 5.1 g.

*Analysis.*—Calculated for $C_{12}H_{12}O$: C, 83.69; H, 7.02. Found: C, 83.67; H, 7.07.

*Step B.—Preparation of 5(8)methoxy-7(6)-methyl-2-butyronaphthone\**

A mixture of 4.0 g. (0.023 mole) of 1-methoxy-3-methylnaphthalene, 3.09 g. (0.029 mole) of butyryl chloride, and 50 ml. of nitrobenzene is cooled to 5° C. and 3.71 g. (0.028 mole) of aluminum chloride is added over 1½ hours. The mixture then is treated by substantially the same method described in Example 8, Step B, yielding a viscous yellow oil, 4.3 g. Upon evaporative distillation, the distillate solidifies to a yellow solid which, after recrystallization from methylcyclohexane, gives 5(8)-methoxy-7(6)-methyl - 2 - butyronaphthone in the form of a pale yellow solid, M.P. 93.5–95.5° C.

*Analysis.*—Calculated for $C_{16}H_{12}O_2$: C, 79.31; H, 7.49. Found: C, 79.30; H, 7.22.

* Analysis has failed to indicate whether the 2-butyronaphthone produced is the 5-methoxy-7-methyl derivative or its 8-methoxy-6-methyl isomer; the subsequent preparations therefore relate to both isomeric derivatives of the said compounds.

*Step C.—Preparation of 5(8)hydroxy-7(6)-methyl-2-butyronaphthone*

A mixture of 5.0 g. (0.02 mole) of the product of Step B and 15.0 g. (0.13 mole) of pyridine hydrochloride is stirred under nitrogen at 200° C. for 1½ hours and then treated by substantially the same method described in Example 1, Step C, to give 2.0 g. of 5(8)-hydroxy-7(6)-methyl-2-butyronaphthone in the form of a yellow solid. Recrystallization from 50% aqueous isopropyl alcohol gives 5(8)-hydroxy-7(6)-methyl-2-butyronaphthone in the form of a pale yellow solid, M.P. 165–167.5° C.

*Analysis.*—Calculated for $C_{15}H_{16}O_2$: C, 78.92; H, 7.06. Found: C, 78.66; H, 6.89.

*Step D.—Preparation of (3-methyl-6(7)-butyryl-1-naphthyloxy)-acetic acid*

To a solution of 2.0 g. (0.009 mole) of the product of Step C in 50 ml. of absolute ethanol containing 0.0091 mole of sodium ethoxide, there is added, after 5 minutes, 1.8 g. (0.011 mole) of ethyl bromoacetate and the mixture then is refluxed for 4 hours and treated in substantially the same manner described in Example 1, Step D, to give 1.53 g. of (3-methyl-6(7)-butyryl-1-naphthyloxy)-acetic acid in the form of a tan solid. Recrystallization from a 50:50 mixture of benzene and cyclohexane gives the product in the form of a white solid, M.P. 141.5–143° C.

*Analysis.*—Calculated for $C_{17}H_{18}O_4$: C, 71.31; H, 6.34. Found: C, 71.23; H, 6.63.

*Step E.—Preparation of [3-methyl-6(7)-(α-methylenebutyryl)-1-naphthyloxy]acetic acid*

A mixture of 2.00 g. (0.007 mole) of the product of Step D, 0.6 g. (0.0074 mole) of paraformaldehyde, and 0.4 ml. of glacial acetic acid is treated by substantially the same method as described in Example 1, Step E, to form the hydrochloride salt of the Mannich base. The solution of the crude Mannich compound is made basic with saturated sodium bicarbonate solution and then treated by substantially the same method described in Example 1, Step F, yielding 1.17 g. of [3-methyl-6(7)-(α-methylenebutyryl)-1-naphthyloxy]acetic acid, in the form of a pale yellow solid. Repeated recrystallization from a mixture of methylcyclohexane and benzene gives the product in the form of a white solid, M.P. 122–123.5° C.

*Analysis.*—Calculated for $C_{18}H_{18}O_4$: C, 72.46; H, 6.08. Found: C, 72.61; H, 6.09.

EXAMPLE 17.—[3-METHYL-4-(α-METHYLENEBUTYRYL)-1-NAPHTHYLOXY]ACETIC ACID

*Step A.—Preparation of 4-bromo-3-methyl-1-methoxynaphthalene*

A solution of 34.4 g. (0.20 mole) of 3-methyl-1-methoxynaphthalene, prepared as described in Example 16, Step A, in 400 ml. of glacial acetic acid is heated to 80° C. Then a solution of 33.6 g. (0.21 mole) of bromine in 100 ml. of glacial acetic acid is added dropwise with stirring, maintaining the temperature at 80° C. The addition requires about 2 hours. Stirring is continued for 15 minutes. The mixture is poured into 2 liters of ice and water and the product is extracted into ether. The ether extract is washed with water, 1 N sodium hydroxide, and again with water. The ether solution is dried and concentrated under reduced pressure yielding a tan solid as a crude product in 90% yield. Recrystallization from methanol-water or acetic acid gives pure 4-bromo-3-methyl-1-methoxynaphthalene melting at 62–63.5° C.

*Analysis.*—Calculated for $C_{12}H_{11}BrO$: C, 57.39; H, 4.42. Found: C, 57.22; H, 4.44.

*Step B.—Preparation of 4-(1-hydroxybutyl)-3-methyl-1-methoxynaphthalene*

A Grignard reagent is prepared from 1.34 g. (0.055 mole) of magnesium and 12.56 g. (0.05 mole) of 4-bromo-3-methyl-1-methoxynaphthalene in 60 ml. of tetrahydrofuran; the reaction being initiated with several drops of ethylene dibromide. The Grignard reagent is cooled to —30° C. and a solution of 3.97 g. (0.055 mole) of butyraldehyde in 40 ml. of tetrahydrofuran is added dropwise with stirring over a 25 minute period. Then the mixture is placed in an ice bath and stirred for 20 hours as the temperature rises slowly to 25° C. The tetrahydrofuran then is removed under reduced pressure and 100 ml. of ether is added, the mixture cooled in ice and decomposed by adding a solution of 5.35 g. (0.1 mole) of ammonium chloride in 50 ml. of water. The ether layer is separated, washed with water, dried, and concentrated under reduced pressure, yielding 11.8 g. of 4-(1-hydroxybutyl)-3-methyl-1-methoxynaphthalene as a viscous yellow oil.

*Step C.—Preparation of 4-butyryl-3-methyl-1-methoxynaphthalene*

A pyridine-chromium complex is prepared by cooling 500 ml. of pyridine to 15° C. and adding 50.0 g. (0.5 mole) of chromium trioxide in small portions with stirring. The addition requires about ½ hour and stirring is continued for another ½ hour as the temperature rises to 25° C. The suspension is cooled to 5° C. and a solution of 43.0 g. of 4-(1-hydroxybutyl)-3-methyl-1-methoxynaphthalene in 500 ml. of pyridine is added. The mixture is stirred at 5° C. for 1½ hours and at room temperature overnight. The dark mixture which results is poured into 5 liters of water and then extracted with ether. The ether extract is washed with water, 1 N hydrochloric acid, 1 N sodium hydroxide, and again with water, and dried and concentrated under reduced pressure. A yellow liquid is obtained (wt. 36.2 g.). Pure 4-butyryl-3-methyl-1-methoxynaphthalene distills at 145–150° C. at 0.5 mm. pressure, $n_D^{25}$ 1.5875.

*Analysis.*—Calculated for $C_{16}H_{18}O_2$: C, 79.31; H, 7.49. Found: C, 78.94; H, 7.34.

*Step D.—Preparation of 4-butyryl-3-methyl-1-naphthol*

A mixture of 3.22 g. (0.14 mole) of sodium and 25 ml. of pyridine is heated under nitrogen at 160–180° C. for 15 minutes with rapid stirring. Then 4.85 g. (0.02 mole) of 4-butyryl-3-methyl-1-methoxynaphthalene in 20 ml. of pyridine is added and excess pyridine is allowed to distill out a side arm tube as the bath temperature is raised to 200° C. The mixture is heated at 200° C. for 5 hours. After cooling, several milliliters of pyridine are added followed by the cautious addition of 50 ml. of water. The aqueous solution is washed with ether, the ether solution washed with 1 N hydrochloric acid and then extracted with 1 N sodium hydroxide. The basic extract and aqueous solution are combined and acidified with excess hydrochloric acid. The solid which separates is extracted into ether, the ether extract washed with water, dried, and concentrated under reduced pressure. A yellow solid is obtained in 71% yield, M.P. 144–147.5° C. Recrystallization from ethanol-water gives pure 4-butyryl-3-methyl-1-naphthol as a pale yellow solid, M.P. 148.5–149.5° C.

Analysis.—Calculated for $C_{15}H_{16}O_2$: C, 78.92; H, 7.06. Found: C, 78.78; H, 7.35.

Step E.—Preparation of (4-butyryl-3-methyl-1-naphthyloxy)acetic acid 4-butyryl-3-methyl-1-naphthol (0.78 g., 0.0034 mole) is added to a solution of 25 ml. of absolute ethanol containing 0.0034 mole of sodium ethoxide and then 0.68 g. (0.004 mole) of ethyl bromoacetate is added. The solution is treated in essentially the same manner described in Example 1, Step D, to give an 84% yield of (4-butyryl-3-methyl-1-naphthyloxy)acetic acid as an oil which solidifies to a pale yellow solid, M.P. 126–129° C. Recrystallization from n-butyl chloride gives a white solid, M.P. 131–132.5° C.

Analysis.—Calculated for $C_{17}H_{18}O_4$: C, 71.31; H, 6.34. Found: C, 71.15; H, 6.56.

Step F.—Preparation of [3-methyl-4-(α-methylenebutyryl)-1-naphthyloxy]acetic acid A mixture of 1.0 g. (0.0035 mole) of (4-butyryl-3-methyl-1-naphthyloxy)acetic acid, 0.12 g. (0.004 mole) of paraformaldehyde, 0.30 g. (0.0036 mole) of dimethylamine hydrochloride, and 10 drops of glacial acetic acid is heated on the steam bath for 3 hours with occasional partial evacuation as in Example 1, Step E. The Mannich base intermediate need not be isolated. The reaction product is crude [3-methyl-4-(α-methylenebutyryl)-1-naphthyloxy]acetic acid which is dissolved in a mixture of 25 ml. of ether and 25 ml. of water. The ether layer is separated, washed with dilute hydrochloric acid and water, dried, and concentrated under reduced pressure to give 0.86 g. (83%) of pale yellow solid identified as [3-methyl-4-(α-methylenebutyryl)-1-naphthyloxy]acetic acid, M.P. 152–154° C. Recrystallization from isopropanol-water raised the melting point to 154–155.5° C.

Analysis.—Calculated for $C_{18}H_{18}O_4$: C, 72.46; H, 6.08. Found: C, 72.58; H, 6.20.

EXAMPLE 18.—[5-METHYL-4-(α-METHYLENEBUTYRYL)-1-NAPHTHYLOXY]ACETIC ACID

Step A.—Preparation of 1-hydroxy-1-methyl-1,2,3,4-tetrahydro-5-naphthol

A Grignard reagent is prepared by treating 43.8 g. (1.8 moles) of magnesium with 256 g. (1.8 moles) of methyl iodide in 900 ml. of ether under nitrogen. Then 74.0 g. (0.36 mole) of 5-acetoxy-3,4-dihydro-1(2H)-naphthalenone in 750 ml. of tetrahydrofuran is added and the mixture stirred under nitrogen for 48 hours. The ether and tetrahydrofuran then are removed under reduced pressure and 500 ml. of ether added and the mixture decomposed by adding excess aqueous ammonium chloride. The ether layer is separated, washed with a mixture of water and dilute hydrochloric acid, dried, and concentrated under reduced pressure to give 63 g. of 1-hydroxy-1-methyl-1,2,3,4-tetrahydro-5-naphthol as a yellow solid.

Step B.—Preparation of ethyl (5-hydroxy-5-methyl-5,6,7,8-tetrahydro-1-naphthyloxy)acetate The 63 g. (0.35 mole) of crude 1-hydroxy-1-methyl-1,2,3,4-tetrahydro-5-naphthol is treated with 65.1 g. (0.39 mole) of ethyl bromoacetate and 16.7 g. (0.37 mole) of sodium ethoxide as in Example 2, Step C, to give crude ethyl (5-hydroxy-5-methyl-5,6,7,8-tetrahydro-1-naphthyloxy)acetate in nearly quantitative yield as a dark yellow oil.

Step C.—Preparation of ethyl (7,8-dihydro-5-methyl-1-naphthyloxy)acetate

The crude ethyl (5-hydroxy-5-methyl-5,6,7,8-tetrahydro-1-naphthyloxy)acetate is dehydrated by dissolving 32.4 g. (0.123 mole) thereof in 40 ml. of benzene and 75 ml. of pyridine and adding 20 g. (0.13 mole) of phosphorous oxychloride. The mixture is stirred on the steam bath for 2 hours and then the solvents are removed under reduced pressure. The residual mixture of oil and solid materials is taken up in 250 ml. of ether and 100 ml. of water, the ether layer separated, washed with dilute hydrochloric acid and water, dried, and concentrated under reduced pressure to give 26.1 g. (87%) of ethyl (7,8-dihydro-5-methyl-1-naphthyloxy)acetate as a dark yellow oil.

Step D.—Preparation of ethyl (5-methyl-5,6,7,8-tetrahydro-1-naphthyloxy)acetate

The crude ethyl (7,8-dihydro-5-methyl-1-naphthyloxy)-acetate is hydrogenated by dissolving 53.0 g. (0.215 mole) in 200 ml. of absolute ethanol and shaking with 5% palladium on carbon under 30 lbs./sq. in. of hydrogen until approximately the theoretical quantity of hydrogen is taken up and hydrogenation ceases. The mixture is filtered under nitrogen and the filtrate concentrated under reduced pressure to give a nearly quantitative yield of ethyl (5-methyl-5,6,7,8-tetrahydro-1-naphthyloxy)acetate.

Step E.—Preparation of (5-methyl-5,6,7,8-tetrahydro-1-naphthyloxy)acetic acid

An 11.8 g. (0.0476 mole) portion of ethyl (5-methyl-5,6,7,8-tetrahydro-1-naphthyloxy)acetate is dissolved in 100 ml. of ethanol, and 5.61 g. (0.10 mole) of potassium hydroxide in 25 ml. of water is added. The solution is heated at reflux for ½ hour, the ethanol removed under reduced pressure and the salt dissolved in 150 ml. of water. The aqueous solution then is washed with ether and acidified with excess hydrochloric acid and filtered to give 8.1 g. of a pale tan solid, M.P. 152–155° C. Recrystallization from ethanol-water gives white (5-methyl-5,6,7,8-tetrahydro-1-naphthyloxy)acetic acid, M.P. 156.5–158.5° C.

Analysis.—Calculated for $C_{13}H_{16}O_3$: C, 70.89; H, 7.32. Found: C, 70.81; H, 7.17.

Step F.—Preparation of (4-butyryl-5-methyl-5,6,7,8-tetrahydro-1-naphthyloxy)acetate acid By replacing the (2-methyl-1-naphthyloxy)acetic acid and the carbon disulfide of Example 8, Step B, with equimolar quantities of (5-methyl-5,6,7,8-tetrahydro-1-naphthyloxy)acetic acid and methylene chloride and extending the time at reflux to 16 hours, there is obtained a 94% yield of (4-butyryl-5-methyl-5,6,7,8-tetrahydro-1-naphthyloxy)acetic acid as a yellow oil.

Step G.—Preparation of ethyl (and methyl) (4-butyryl-5-methyl-5,6,7,8-tetrahydro-1-naphthyloxy)acetate The ethyl ester is prepared from 5.4 g. (0.0185 mole) of (4-butyryl-5-methyl-5,6,7,8-tetrahydro-1-naphthyloxy)-acetic acid by heating at reflux with 75 ml. of absolute ethanol and several drops of concentrated sulfuric acid for 1½ hours with a slow distillation of the ethanol. Then the ethanol is removed under reduced pressure and the residual oil taken up in ether. The ether is washed with water and cold sodium carbonate solution, dried, filtered, and concentrated to give 4.4 g. of ethyl (4-butyryl-5-methyl-5,6,7,8-tetrahydro-1-naphthyloxy)acetate distilling at 208–212° C./0.5 mm. by short-path distillation, $n_D^{25}$ 1.5364.

Analysis.—Calculated for $C_{19}H_{26}O_4$: C, 71.67; H, 8.23. Found: C, 71.60; H, 7.98.

The methyl ester is prepared by a similar procedure employing methanol in place of the ethanol indicated supra.

Step H.—Preparation of methyl (4-butyryl-5-methyl-1-naphthyloxy)acetate

Methyl (4-butyryl-5-methyl-5,6,7,8-tetrahydro-1-naphthyloxy)acetate, 9.11 g. (0.03 mole), is dissolved in 100 ml. of anhydrous benzene. Then 8.52 g. (0.0375 mole) of 2,3-dichloro-5,6-dicyano-1,4-benzoquinone is added and the mixture is stirred at reflux for 3 hours under nitrogen. Another 8.52 g. (0.0375 mole) of the quinone is added and reflux continued for an additional 16 hours. The cooled reaction mixture is filtered and the filtrate concentrated under reduced pressure to a dark oil. The oil is taken up in 100 ml. of ether, the ether solution washed thoroughly with water, sodium bicarbonate (cold) and again with water, dried, and concentrated under reduced pressure to give 5.90 g. of methyl (4-butyryl-5-methyl-1-naphthyloxy)acetate as a pale tan solid. Continued recrystallization from isopropanol-water raised the melting point to 89–94° C.

*Step I.—Preparation of (4-butyryl-5-methyl-1-naphthyloxy)acetic acid*

Hydrolysis of methyl (4-butyryl-5-methyl-1-naphthyloxy)-acetate is accomplished in 82% yield by the procedure of Example 18, Step E. The white solid is recrystallized from isopropanol-water, to yield pure (4-butyryl-5-methyl-1-naphthyloxy)acetic acid, M.P. 138.5–140° C.

*Analysis.*—Calculated for $C_{17}H_{18}O_4$: C, 71.31; H, 6.34. Found: C, 71.11; H, 6.42.

*Step J.—Preparation of [5-methyl-4-(α-methylenebutyryl)-1-naphthyloxy]acetic acid*

A mixture of 0.65 g. (0.00227 mole) of (4-butyryl-5-methyl-1-naphthyloxy)acetic acid, 0.19 g. (0.00233 mole) of dimethylamine hydrochloride, 0.07 g. (0.00233 mole) of paraformaldehyde, and 6 drops of glacial acetic acid was treated as in Example 17, Step G. The ether layer gives 0.35 g. of white solid, M.P. 137–141° C. The aqueous layer is treated with sodium bicarbonate as in Example 1, Step F. Another 0.23 g. of product is obtained, M.P. 136–139.5° C. Recrystallization from n-butyl chloride gives [5 - methyl-4-(α-methylenebutyryl)-1-naphthyloxy]-acetic acid melting at 144–145.5° C.

*Analysis.*—Calculated for $C_{18}H_{18}O_4$: C, 72.46; H, 6.08. Found: C, 72.24; H, 6.00.

EXAMPLE 19.—[6-METHYL-4-(α-METHYLENE BUTYRYL)-1-NAPHTHYLOXY]ACETIC ACID

*Step A.—Preparation of (6-methyl-1-naphthyloxy)acetic acid*

By replacing in Example 1, Step D, the 5-hydroxy-1-butyronaphthone by an equimolecular quantity of 6-methyl-1-naphthol and following substantially the same procedure described in Example 1, Step D, there is obtained (6-methyl-1-naphthyloxy)acetic acid.

*Step B.—Preparation of (6-methyl-4-butyryl-1-naphthyloxy)acetic acid*

By replacing in Example 8, Step B, the (2-methyl-1-naphthyloxy)acetic acid by an equimolecular quantity of (6-methyl-1-naphthyloxy)acetic acid and following substantially the same procedure described in Example 8, Step B, there is obtained (6-methyl-4-butyryl-1-naphthyloxy)acetic acid.

*Step C.—Preparation of [6-methyl-4-(α-methylenebutyryl)-1-naphthloxy]acetic acid*

By replacing in Example 1, Step E, the (5-butyryl-1-naphthyloxy)acetic acid by an equivalent quantity of (6-methyl-4-butyryl-1-naphthyloxy)acetic acid and following substantially the same procedure described in Example 1, Step E, there is obtained [6-methyl-4-(α-dimethylaminomethylbutyryl)-1-naphthyloxy]acetic acid hydrochloride which, when treated with a saturated sodium bicarbonate solution and following substantially the same method described in Example 1, Step F, is converted to [6-methyl-4-(α-methylenebutyryl)-1-naphthyloxy]acetic acid.

EXAMPLE 20.—[4 - (α - METHYLENEVALERYL)-1-NAPHTHYLOXY]ACETIC ACID

By following substantially the same procedure described in Example 8, Step B, but replacing the (2-methyl-1-naphthyloxy)acetic acid and the butyryl chloride employed therein by equivalent quantities of (1-naphthyloxy)acetic acid and n-valeryl chloride, there is obtained (4-n-valeryl-1-naphthyloxy)acetic acid. This product then is converted to the hydrochloride salt of [4-(α-dimethylaminomethylvaleryl)-1-naphthyloxy]acetic acid by substantially the same method described in Example 1, Step E. By treating this product with a saturated sodium bicarbonate solution by substantially the same method described in Example 1, Step F, there is obtained [4-(α-methylenevaleryl)-1-naphthyloxy]acetic acid.

EXAMPLE 21.—[4(α-METHYLENEISOVALERYL)-1-NAPHTHYLOXY]ACETIC ACID

By replacing the (2-methyl-1-naphthyloxy)acetic acid and the butyryl chloride employed in Example 8, Step B, by equivalent quantities of (1-naphthyloxy)acetic acid and isovaleryl chloride respectively and following substantially the same procedure described in Example 8, Step B, there is obtained (4-isovaleryl-1-naphthyloxy)acetic acid, M.P. 120–121.5° C.

*Analysis.*—Calcuated for $C_{17}H_{18}O_4$: C, 71.31; H, 6.34. Found: C, 71.37; H, 6.25.

This compound then is converted to the salt of its Mannich base by substantially the same procedure described in Example 1, Step E, to give the hydrochloride salt of [4-[2-(dimethylaminomethyl)isovaleryl]-1-naphthyloxy]-acetic acid. This product then is treated with a saturated sodium bicarbonate solution by substantially the same procedure described in Example 1, Step F, to give [4-(α-methyleneisovaleryl)-1-naphthyloxy]-acetic acid.

EXAMPLE 22.—[4 - (α - METHYLENECAPROYL)-1-NAPHTHYLOXY]ACETIC ACID

By replacing the (2-methyl-1-naphthyloxy)acetic acid and butyryl chloride employed in Example 8, Step B, by equimolecular quantities of (1-naphthyloxy)acetic acid and caproyl chloride respectively and following substantially the same procedure described in Example 8, Step B, there is obtained (4-caproyl-1-naphthyloxy)acetic acid. This product then is converted to the salt of its Mannich base by substantially the same procedure described in Example 1, Step E, to give [4-(α-dimethylaminomethylcaproyl-1-naphthyloxy]acetic acid hydrochloride. Treatment of this product with sodium bicarbonate solution by substantially the same procedure described in Example 1, Step F, gives [4-(α-methylenecaproyl)-1-naphthyloxy]-acetic acid.

EXAMPLE 23.—[4-(α-METHYLENEENANTHYL)-1-NAPHTHYLOXY]ACETIC ACID

By replacing the (2-methyl-1-naphthloxy)acetic acid and the butyryl chloride employed in Example 8, Step B, by equimolecular quantities of (1-naphthyloxy)acetic acid and enanthyl chloride respectively, and following substantially the same procedure described in Example 8, Step B, there is obtained (4-enanthyl-1-naphthyloxy)acetic acid. This compound is converted to the salt of its Mannich base by substantially the same procedure described in Example 1, Step E, to give [4-(α-dimethylaminomethylenanthyl)-1-naphthyloxy]acetic acid hydrochloride. Treatment of this product with a solution of sodium bicarbonate by substantially the same procedure described in Example 1, Step F, gives [4-(α-methyleneenanthyl)-1-naphthyloxy]acetic acid.

EXAMPLE 24.—[4-(β-PHENYLACRYLOYL)-1-NAPHTHYLOXY]ACETIC ACID

By replacing the (2-methyl-1-naphthyloxy)acetic acid and the butyryl chloride employed in Example 8, Step B, by equimolecular quantities of (1-naphthyloxy)acetic acid and acetyl chloride respectively, and following substantially the same procedure described in Example 8, Step B, there is obtained (4-acetyl-1-naphthyloxy)acetic acid. Equimolecular quantities of this compound and of benzaldehyde are dissolved in a mixture of sodium hydroxide (about 3 mole excess) in water and ethanol.

The solution is kept at 25–30° C. for about 16 hours, acidified and the solid that separates is collected and dried to give [4-(β-phenylacryloyl)-1-naphthyloxy]acetic acid.

EXAMPLE 25.—[4-[β-(o-CHLOROPHENYL)ACRYLOYL]-1-NAPHTHYLOXY]ACETIC ACID

Equimolecular quantities of (4-acetyl-1-naphthyloxy)-acetic acid (prepared as described in Example 24) and o-chlorobenzaldehyde are dissolved in a mixture of sodium hydroxide in water and ethanol. The solution is kept at 25–30° C. for about 16 hours, acidified and the solid that separates is collected and dried to give [4-[β-(o-chlorophenyl)acryloyl]-1-naphthyloxy]acetic acid.

EXAMPLE 26.—[4-(α-METHYL-β-PHENYL-ACRYLOYL)-NAPHTHYLOXY]ACETIC ACID

Equimolecular quantities of (4-propionyl-1-naphthyloxy)acetic acid (prepared as described in Example 10, Step A) and benzaldehyde are dissolved in a mixture of sodium hydroxide in water and ethanol. The solution is kept at 25–30° C. for approximately 16 hours, acidified and the solid that separates is collected and dried to give [4 - (α - methyl-β-phenylacryloyl)-1-naphthyloxy]acetic acid.

EXAMPLE 27.—[4-[β-(o-HYDROXYPHENYL)ACRYLOYL]-1-NAPHTHYLOXY]ACETIC ACID

Equimolecular quantities of (4-acetyl-1-naphthyloxy)acetic acid (prepared as described in Example 24) and salicylaldehyde are dissolved in a mixture of sodium hydroxide in water and ethanol. The solution is kept at 25–30° C. for approximately 16 hours, acidified and the solid that separates is collected and dried to give [4-[β-(o-hydroxyphenyl)acryloyl]-1-naphthyloxy]acetic acid.

EXAMPLE 28.—[4-(α-BENZYLACRYLOYL)-1-NAPHTHYLOXY]ACETIC ACID

[4-(β-Phenylacryloyl)-1-naphthyloxy]acetic acid (prepared as described in Example 24) is dissolved in isopropyl alcohol and hydrogenated in the presence of 5% palladium on charcoal at 26° C. and about 750 mm. pressure until the required amount of hydrogen is absorbed. The solution then is warmed and filtered to remove the catalyst, the alcohol is removed from the product by evaporation to give [4-(β-phenylpropionyl)-1-naphthyloxy]acetic acid. The salt of the Mannich base of this compound is prepared by substantially the same method described in Example 1, Step E, and upon treatment with aqueous sodium bicarbonate solution by substantially the same method described in Example 1, Step F, gives [4-(α-benzylacryloyl)-1-naphthyloxy]acetic acid.

EXAMPLE 29.—[4-(1-CYCLOPENTENYLCARBONYL)-1-NAPHTHYLOXY]ACETIC ACID

To a precooled mixture of 1-methoxynaphthalene (0.334 mole), cyclopentanecarbonyl chloride (0.334 mole) and petroleum ether (300 ml.) is added a slight excess of powdered aluminum chloride (0.36 mole) over a period of one hour with stirring. This mixture then is heated at 40° C. for about 6 hours with intermittent stirring, cooled, poured into a mixture of ice and water and concentrated hydrochloric acid and extracted with ether. The ether extract then is distilled to give cyclopentyl 4-methoxy-1-naphthyl ketone. Treatment of this product with pyridine hydrochloride by substantially the same procedure described in Example 1, Step C, gives cyclopentyl 4-hydroxy-1-naphthyl ketone. This product is added to a solution of sodium ethoxide in ethyl alcohol and then reacted with a slight excess of ethyl bromoacetate by substantially the same procedure described in Example 1, Step D, to give (4-cyclopentylcarbonyl-1-naphthyloxy)acetic acid. Equimolecular quantities of this product dissolved in acetic acid and bromine dissolved in acetic acid are combined slowly with stirring over a period of about ½ hour. The reaction mixture then is poured into one liter of water containing sodium bisulfite, and the aqueous phase then is removed to give [4 - (1-bromocyclopentylcarbonyl)-1-naphthyloxy]acetic acid. This brominated compound is dehydrobrominated by treatment with silver acetate in benzene. The reaction mixture is stirred and refluxed for about 4 hours and then cooled. Water containing concentrated hydrochloric acid is added whereupon the silver salts precipitate and are removed by filtration, and the benzene removed by evaporation to give [4-(1-cyclopentenylcarbonyl)-1-naphthyloxy]acetic acid.

EXAMPLE 30.—[4-(1-CYCLOHEXENYLCARBONYL)-1-NAPHTHYLOXY]ACETIC ACID

To a mixture of equimolecular quantities of 1-methoxynaphthalene and cyclohexanecarbonyl chloride in ligroin, a slight excess of aluminum chloride is added gradually with stirring at a temperature of about 5–15° C. After addition is complete, the mixture is allowed to warm to 25° C. and then is stirred for approximately 3 hours and kept at 25–30° C. for approximately 16 hours. The ligroin is decanted and the residue hydrolyzed with water containing a small amount of concentrated hydrochloric acid to give cyclohexyl 4-methoxy-1-naphthyl ketone. This product then is treated with pyridine hydrochloride by substantially the same procedure described in Example 1, Step C, to give cyclohexyl 4-hydroxy-1-naphthyl ketone. This product then is added to a solution of sodium ethoxide in ethyl alcohol and treated with a slight excess of ethyl bromoacetate by substantially the same procedure described in Example 1, Step C, to yield [4-(cyclohexylcarbonyl)-1-naphthyloxy] acid. Equimolecular quantities of this product dissolved in acetic acid and bromine dissolved in acetic acid are combined slowly with stirring over approximately ½ hour. The reaction mixture then is poured into one liter of water containing sodium bisulfite and the aqueous phase then removed to give [4-(1-bromocyclohexylcarbonyl)-1-naphthyloxy] acetic acid. This bromo compound then is dehydrobrominated by treatment with silver acetate by substantially the same procedure described in Example 29 to yield [4-(1-cyclohexenylcarbonyl)-1-naphthyloxy]acetic acid.

EXAMPLE 31.—[4-(α-CARBOXYMETHYLACRYLOYL)-1-NAPHTHYLOXY]ACETIC ACID 4-(β-Carboxypropionyl)-1-naphthol (0.05 mole) is dissolved in 250 ml. of absolute ethanol containing 0.12 mole sodium ethoxide. After the solution has refluxed for 10 minutes, 20 g. of ethyl bromoacetate (0.12 mole) is added and the solution then is treated by substantially the same method described in Example 1, Step D, to give a precipitate which upon recrystallization from a mixture of ethanol and water yields [4-(β-carboxypropionyl)-1-naphthyloxy]acetic acid, M.P. 169–171° C. This product then is converted to the hydrochloride salt of its Mannich base by substantially the same procedure described in Example 1, Step E, to give [4-(α-dimethylaminomethyl-β-carboxypropionyl)-1-naphthyloxy]acetic acid hydrochloride. Upon treatment of this product with aqueous sodium bicarbonate by substantially the same procedure described in Example 1, Step F, there is obtained [4-(α-carboxymethylacryloyl)-1-naphthyloxy]-acetic acid.

EXAMPLE 32.—[4-(α-METHYLENEBUTYRYL)-1-NAPHTHYLOXY]ACETAMIDE

In a 50 ml., round-bottomed flask is placed [4-(α-methylenebutyryl)-1-naphthyloxy]acetic acid, obtained as described in Example 11, Step C (0.02 mole), thionyl chloride (0.04 mole), and dry benzene (15 ml.). The flask is fitted with a reflux condenser having a drying tube. The mixture is refluxed on a steam bath for approximately 1 hour, and the volatile materials are removed by vacuum distillation at about 60° C. The residue is taken up in cold 28% aqueous ammonia solution (100 ml.) and the solid that precipitates is removed by filtration, washed with water and dried in vacuo to give [4-(α-methylenebutyryl)-1-naphthyloxy]acetamide.

EXAMPLE 33.—α-[4-(α-METHYLENEBUTYRYL)-1-NAPHTHYLOXY]PROPIONIC ACID 4-hydroxy-1-butyrylnaphthone is added to a solution of sodium ethoxide in ethyl alcohol and reacted with a slight excess of ethyl α-bromopropionate by substantially the same procedure described in Example 1, Step D, to give α-(4-butyryl-1-naphthyloxy)propionic acid. This product then is converted to the hydrochloride salt of its Mannich base by substantially the same procedure described in Example 1, Step E, to give α-[4-(α-dimethyl-aminomethylpropionyl)-1-naphthyloxy]propionic acid hydrochloride. Treatment of this product with an aqueous sodium bicarbonate solution by substantially the same procedure described in Example 1, Step F, gives α-[4-(α-methylenebutyryl)-1-naphthyloxy]propionic acid.

EXAMPLE 34.—4-[4-(α-METHYLENEBUTYRYL)-1-NAPHTHYLOXYMETHYL]BENZOIC ACID

*Step A.—Preparation of 4-chloromethylbenzonitrile* p-Tolunitrile (0.854 mole) is placed in a 3-necked flask fitted with gas inlet-outlet tube, stirrer and thermometer. Stirring is started and the nitrile is heated to 120–130° C. Chlorine gas is passed into the liquid at a moderate rate, and the reaction activated by an incandescent lamp. The addition is continued until the nitrile takes up 30 g. of the gas (about 2 hours). The material is allowed to stand overnight in air whereupon a crystalline mass forms. This is washed twice with ethanol and dried in air. Concentration of the ethanol solution to half its volume gives a 57% yield of 4-chloromethylbenzonitrile, M.P. 75–77° C.

*Step B.—Preparation of 4-chloromethylbenzoic acid*

4-chloromethylbenzonitrile (0.164 mole) is refluxed and stirred with concentrated hydrochloric acid (500 ml.) for about 14 hours. Upon cooling, a solid is obtained which is removed by filtration, dried in a dessicator to give a 94.5% yield of 4-chloromethylbenzoic acid, M.P. 202–203° C.

*Step C.—Preparation of ethyl 4-chloromethylbenzoate*

4-chloromethylbenzoic acid (0.156 mole) is dissolved in absolute ethanol (225 ml.) and heated to 60° C. in a 4-necked flask fitted with gas inlet tube, thermometer, stirrer, reflux condenser, and drying tube. Stirring is started and anhydrous hydrogen chloride gas is passed in for one hour, the temperature being maintained at 50–60° C. The solution then is refluxed one hour, cooled and permitted to stand overnight. The ethanol then is evaporated in vacuo, the residue taken up in ether, washed with 5% sodium carbonate, dried and evaporated to an oil which distills at 91–93° C. at 0.6 mm. pressure to give a 74% yield of ethyl 4-chloromethylbenzoate.

*Step D.—Preparation of 4-(4-butyryl-1-naphthyloxymethyl)benzoic acid*

4-hydroxybutyronaphthone (0.25 mole) is dissolved in anhydrous methanol (500 ml.), and sodium metal (0.2 mole) is added in portions. When all the sodium dissolves, ethyl 4-chloromethylbenzoate (0.125 mole) is added and the mixture is refluxed for 19 hours. The volume of methanol is reduced to 200 ml. and the mixture cooled, filtered, water added and the mixture extracted with ether. The ether extract is washed with 5% sodium hydroxide, dried and evaporated to remove the ether. The residue is taken up in 10% sodium hydroxide and heated on a steam bath with stirring for 2 hours. After cooling and acidification with hydrochloric acid, there is obtained 4-(4-butyryl-1-naphthyloxymethyl)-benzoic acid.

*Step E.—Preparation of 4-[4-(α-methylenebutyryl)-1-naphthyloxymethyl]benzoic acid*

4-(-4-butyryl-1-naphthyloxymethyl)benzoic acid (0.015 mole), paraformaldehyde (0.065 mole) and dimethylamine hydrochloride (0.045 mole) are mixed in a 100 ml. flask fitted with a drying tube. The flask is heated to 120–130° C. for ½ hour, with aspirator vacuum being applied for one minute at intervals of 6 to 7 minutes. The reaction mixture then is taken up in hot ethyl alcohol, and excess water is added to precipitate 4-[4-(α-methylenebutyryl)-1-naphthyloxymethyl]-benzoic acid.

EXAMPLE 35.—3-[4-(α-METHYLENEBUTYRYL)-1-NAPHTHYLOXYMETHYL]BENZOIC ACID

*Step A.—Preparation of methyl 3-bromomethylbenzoate*

3-methylbenzoyl chloride (0.68 mole) is placed in a 4-necked flask, fitted with stirrer, reflux condenser, drying tube, thermometer and dropping funnel, and heated to 180° C. Stirring is started and the temperature maintained at 180° C., and bromine (0.69 mole) is added dropwise over a period of about 1 hour. The mixture then is stirred an additional 1.5 hours at 180° C. and finally cooled. With stirring maintained, methanol (67 ml.) is added to the mixture dropwise over an hour. The mixture then is distilled to give the pure product which crystallizes upon standing. There is thus obtained a 50% yield of methyl 3-bromoethylbenzoate, B.P. 136–137° C. at 8 mm. pressure.

*Step B.—Preparation of methyl 3-(4-butyryl-1-naphthyloxymethyl)-benzoate*

4-hydroxybutyrophenone (0.09 mole) is dissolved in anhydrous methanol (200 ml.) and sodium metal (0.075 mole) is added in portions. When all the sodium is dissolved, methyl 3-bromomethylbenzoate (0.044 mole) is added and the mixture refluxed 24 hours. The volume of solvent then is reduced to about 50 ml. and about 250 ml. of water is added. The mixture is extracted with ether, washed with 5% sodium hydroxide and water, dried and evaporated to give methyl 3-(4-butyryl-1-naphthyloxymethyl)benzoate.

*Step C.—Preparation of 3-(4-butyryl-1-naphthyloxymethyl)benzoic acid*

Methyl 3 - (4 - butyryl - 1 - naphthyloxymethyl)benzoate (0.018 mole) is heated on the steam bath and stirred for 1.5 hours with 10% sodium hydroxide (25 ml.). After cooling and acidification, there is obtained 3-(4-butyryl-1-naphthyloxymethyl)benzoic acid.

*Step D.—Preparation of 3[4-(α-methylenebutyryl)-1-naphthloxymethyl]-benzoic acid*

3-(4-butyryl-1-naphthyloxymethyl)benzoic acid (0.010 mole), paraformaldehyde (0.1 mole) and dimethylamine hydrochloride (0.036 mole) are mixed in a 50 ml. flask fitted with a drying tube. The flask is heated to 120–130° C. for ½ hour, the aspirator vacuum applied for one minute at intervals of 5 to 6 minutes, and the reaction mixture is taken up into hot ethyl alcohol and excess water is added to give 3-[4-(α-methylenebutyryl)-1-naphthyloxymethyl]benzoic acid.

EXAMPLE 36.—METHYL [4-(α-METHYLENEBUTYRYL)-1-NAPHTHYLOXY]ACETATE

A solution of [4-(α-methylenebutyryl)-1-naphthyloxy]-acetic acid, prepared as described in Example 11, Step C (0.056 mole), absolute methanol (100 ml.) and 6 N ethanolic hydrochloric acid (10 drops) are allowed to stand at 25° C. for six days. The solvent then is removed in vacuo and the residue is taken up in ether and traces of the free acid removed by extraction with saturated sodium bicarbonate solution. The ethereal solution is dried over anhydrous sodium sulfate and the ether then removed by distillation to give methyl [4-(α-methylenebutyryl)-1-naphthyloxy]acetate.

EXAMPLE 37.—4-[4-(α-METHYLENEBUTYRYL)-1-NAPHTHYLOXY]BENZOIC ACID

*Step A.—Preparation of 4-(1-naphthyloxy)benzoic acid*

Sodium hydride (0.063 mole) is dissolved in anhydrous ethylene glycol dimethyl ether (50 ml.). To this mixture is added 0.058 mole of 1-naphthol as rapidly as evolution of hydrogen gas permits. The glycol dimethyl ether is evaporated in vacuo leaving a dry solid. Additional 1-naphthol (0.02 mole) dry copper metal (1 gram) as catalyst and methyl p-iodobenzoate (0.057 mole) are added and the whole well mixed together. This mixture is heated on a Wood's metal bath at 180–200° C. for 5 hours and cooled yielding a precipitate which is taken up in ethyl acetate. The ethylacetate solution is extracted several times with saturated aqueous sodium bicarbonate. The combined aqueous extracts are acidified yielding a precipitate of 4-(1-naphthyloxy)-benzoic acid.

*Step B.—Preparation of 4-[4-(α-methylenebutyryl)-1-naphthyloxy]benzoic acid*

By following substantially the same procedure described in Example 8, Step B, but replacing the (2-methyl-naphthyloxy)acetic acid employed therein by an equivalent quantity of 4-(1-naphthyloxy)benzoic acid, there is obtained 4-(4-butyryl-1-naphthyloxy)benzoic acid. This product then is converted to the hydrochloride salt of 4 - [4 - (α - dimethylaminomethylbutyryl) - 1 - naphthyloxy]benzoic acid by substantially the same method described in Example 1, Step E. Treatment of this product with a saturated sodium bicarbonate solution by substantially the same method described in Example 1, Step F, gives 4-[4-(α-methylenebutyryl)-1-naphthyloxy]benzoic acid.

EXAMPLE 38.—[4-(α-ISOPROPYLIDENEPROPIONYL)-1-NAPHTHYLOXY]ACETIC ACID

*Step A.—Preparation of [4-(α-methylisovaleryl)-1-naphthyloxy]acetic acid*

[4-(α-methyleneisovaleryl)-1-naphthyloxy]acetic acid (prepared as described in Example 21) is dissolved in isopropyl alcohol and hydrogenated in the presence of 5% palladium on charcoal at about 26° C. and about 750 mm. pressure until the required amount of hydrogen is absorbed to yield [4-(α-methylisovaleryl)-1-naphthyloxy]acetic acid.

*Step B.—Preparation of [4-(α-bromo-α-methylisovaleryl)-1-naphthyloxy]acetic acid*

The product obtained in Step A is brominated by substantially the same method described in Example 12, Step B, to give [4-(α-bromo-α-methylisovaleryl)-1-naphthyloxy]acetic acid.

*Step C.—Preparation of [4-(α-isopropylidenepropionyl)-1-naphthyloxy]acetic acid*

The brominated product obtained in Step B is dehydrobrominated by treatment with lithium bromide in dimethylformamide by substantially the same procedure described in Example 12, Step C, to yield [4-(α-isopropylidenepropionyl)-1-naphthyloxy]acetic acid.

EXAMPLE 39.—(4-SENECIOYL-1-NAPHTHYLOXY)ACETIC ACID

[4-(α-bromoisovaleryl) - 1 - naphthyloxy]acetic acid (0.035 mole), prepared as described in Example 2, Steps A through E, is added to a solution of trimethylamine (0.4 mole) in absolute ethanol (150 ml.). The solution is sealed in a glass-lined autoclave and heated at 80° C. for 18 hours. On cooling and opening the autoclave, the reaction mixture is filtered to remove any solid material and the filtrate then is concentrated to a small volume by evaporation on a steam bath. The residue is added to water and acidified with hydrochloric acid and then extracted into chloroform. The chloroform extract is then extracted with sodium bicarbonate solution and the aqueous extract treated with decolorizing charcoal, filtered and the filtrate acidified with hydrochloric acid to give (4-senecioyl-1-naphthyloxy)acetic acid.

EXAMPLE 40.—[4-(α-BROMO-β-METHYLACRYLOYL)-1-NAPHTHYLOXY]ACETIC ACID

*Step A.—Preparation of [4-(β-chlorobutyryl)-1-naphthyloxy]acetic acid*

To a suspension of 0.25 mole of aluminum chloride and 0.05 mole of (1-naphthyloxy)acetic acid in 250 ml. carbon disulfide, a solution of 0.055 mole of β-chlorobutyryl chloride in 25 ml. of carbon disulfide is added over 15 min. at room temperature. The mixture is stirred at room temperature for 30 minutes and the carbon disulfide decanted. The residue is cooled in an ice bath and treated with 125 ml. ice water and 25 ml. concentrated hydrochloric acid. The product is extracted with ether and the extract washed with water, dried over sodium sulfate, filtered and evaporated to dryness on the steam bath to give [4-(β-chlorobutyryl)-1-naphthyloxy]acetic acid.

*Step B.—Preparation of [4-(β-methylacryloyl)-1-naphthyloxy]acetic acid*

A solution of 0.005 mole of [4-(β-chlorobutyryl)-1-naphthyloxy]acetic acid in 10 ml. of methanol containing 0.015 mole of freshly fused potassium acetate is allowed to stand at room temperature for 5 hours and concentrated to dryness in vacuo at room temperature. The residue is treated with dilute hydrochloric acid and the product extracted with ether. The ethereal extract is washed with water, dried over sodium sulfate, filtered and evaporated to dryness on the steam bath to give [4-(β-methylacryloyl)-1-naphthyloxy]acetic acid.

*Step C.—Preparation of [4-(α,β-dibromobutyryl)-1-naphthyloxy]acetic acid*

A solution of 0.02 mole of bromine in 25 ml. of chloroform is added dropwise over 30 minutes to a solution of 0.02 mole of [4-(β-methylacryloyl)-1-naphthyloxy]acetic acid in 50 ml. of ether, cooled in an ice bath. After stirring for 45 minutes at room temperature, the solution is concentrated to dryness in vacuo to give [4-(α,β-dibromobutyryl)-1-naphthyloxy]acetic acid.

*Step D.—Preparation of [4-(α-bromo-β-methylacryloyl)-1-naphthyloxy]acetic acid*

A solution of 0.01 mole of [4-(α,β-dibromobutyryl)-1-naphthyloxy]acetic acid in 50 ml. of methanol containing 0.03 mole of potassium acetate is stirred at room temperature for 48 hours, filtered and concentrated to dryness in vacuo. The residue is added to water, acidified with dilute hydrochloric acid and the product extracted with ether. The ethereal extract is washed with water, dried over sodium sulfate, filtered, concentrated to dryness to give [4-(α-bromo-β-methylacryloyl)-1-naphthyloxy]acetic acid.

EXAMPLE 41.—[4-(α-BROMO-β-PHENYLACRYLOYL)-1-NAPHTHYLOXY]ACETIC ACID

*Step A.—Preparation of [-4-(α,β-dibromo-β-phenylpropionyl)-1-naphthyloxy]acetic acid*

[4-(β-phenylacryloyl)-1-naphthyloxy]acetic acid, prepared as described in Example 24, (0.075 mole) is dissolved in acetic acid (300 ml.) at 50° C. and bromine (0.075 mole) in acetic acid (20 ml.) is added dropwise with stirring at 40 to 50° C. over a period of 30 minutes. The reaction mixture then is poured into 1 liter of water containing sodium bisulfite (1 to 2 grams) to give [4-(α,β-dibromo-β-phenylpropionyl)-1-naphthyloxy]acetic acid which can be extracted into ether, washed with water and dried over sodium sulfate.

*Step B.—Preparation of [4-(α-bromo-β-phenylacryloyl)-1-naphthyloxy]acetic acid*

Acetic acid (300 ml.) is added to the dried ether solution obtained as described in Step A above. The mixture is heated on a steam bath in an open flask to evaporate the ether. Anhydrous potassium carbonate (0.135 mole) then is added cautiously and the mixture heated on a steam bath for about five hours, cooled and poured into 1 liter of water, and [4-(α-bromo-β-phenylacryloyl)-1-naphthyloxy]acetic acid separates from the solution.

EXAMPLE 42.—[4-(α-METHYLENEISOCAPROYL)-1-NAPHTHYLOXY]ACETIC ACID

Step A.—Preparation of (4-isocaproyl-1-naphthyloxy) acetic acid

By replacing the (2-methyl-1-naphthyloxy)acetic acid and the butyryl chloride employed in Example 8, Step B, by equivalent quantities of (1-naphthyloxy)acetic acid and isocaproyl chloride respectively, and following substantially the same procedure described in Step B of Example 8, there is obtained (4-isocaproyl-1-naphthyloxy) acetic acid.

Step B.—[4-(α-methyleneisocaproyl)-1-naphthyloxy] acetic acid

By replacing the (5-butyryl-1-naphthyloxy)acetic acid employed in Example 1, Step E, by an equivalent quantity of (4-isocaproyl-1-naphthyloxy)acetic acid and following substantially the same procedures described in Example 1, Steps E and F, there is obtained [4-(α-methyleneisocaproyl)-1-naphthyloxy]acetic acid.

EXAMPLE 43.—[4-(α-HYDROXY-β-PHENYLACRYLOYL)-1-NAPHTHYLOXY]ACETIC ACID

Potassium hydroxide (0.0378 mole) is dissolved in 95% ethanol (50 ml.) and any insoluble suspended potassium carbonate is removed by filtrate. [4-(α,β-dibromo-β-phenylpropionyl)-1-naphthyloxy]acetic acid (0.0126 mole) prepared as described in Example 41, Step A, is added to this solution and dissolved by shaking. The mixture then is kept at 25–30° C. for approximately 4 hours and any insoluble potassium bromide is removed by filtration. The filtrate is heated on a steam bath for about 7 minutes, cooled, poured into water and acidified with hydrochloric acid to give [4-(α-hydroxy-β-phenylacryloyl)-1-naphthyloxy]acetic acid.

EXAMPLE 44.—[4-(α-ISOPROPYLIDENEBUTYRYL)-1-NAPHTHOXY]ACETIC ACID AND [4-(α-ETHYLIDENE-β-METHYLBUTYRYL)-1-NAPHTHYLOXY]ACETIC ACID

Step A.—Preparation of [4-(α-ethylisovaleryl)-1-naphthyloxy]acetic acid

By replacing the (2-methyl-1-naphthyloxy)acetic acid and the butyryl chloride employed in Example 8, Step B, by equivalent quantities of (1-naphthyloxy)acetic acid and α-ethylisovaleryl chloride and following substantially the same procedure described in Example 8, Step B, there is obtained [4-(α-ethylisovaleryl)-1-naphthyloxy]acetic acid.

Step B.—Preparation of [4-(α-bromo-α-ethylisovaleryl)-1-naphthyloxy]acetic acid By replacing the [4-(α-ethylbutyryl)-1-naphthyloxy]acetic acid employed in Example 12, Step B, by an equimolecular quantity of [4-(α-ethylisovaleryl)-1-naphthyloxy]acetic acid and following substantially the same procedure described in Step B of Example 12, there is obtained [4-(α-bromo-α-ethylisovaleryl)-1-naphthyloxy]acetic acid.

Step C.—Preparation of [4-(α-isopropylidenebutyryl)-1-naphthyloxy]acetic acid and [4-(α-ethylidene-β-methylbutyryl)-1-naphthyloxy]acetic acid By replacing the [4-(α-bromo-α-ethylbutyryl)-1-naphthyloxy]acetic acid employed in Step C of Example 12 by an equimolecular quantity of [4-(α-bromo-α-ethylisovaleryl)-1-naphthyloxy]acetic acid and following substantially the same procedure described in Example 12, Step C, there is obtained [4-(α-isopropylidenebutyryl)-1-naphthyloxy]acetic acid and [4-(α-ethylidene-β-methylbutyryl)-1-naphthyloxy]acetic acid.

EXAMPLE 45.—[4-(α-CYCLOPENTANEACRYLOYL)-1-NAPHTHYLOXY]ACETIC ACID

Step A.—Preparation of [4-cyclopentaneacetyl-1-naphthyloxy]acetic acid

By replacing the (2-methyl-1-naphthyloxy)acetic acid and the butyryl chloride employed in Example 8, Step B, by equimolecular quantities of (1-naphthyloxy)acetic acid and cyclopentaneacetyl chloride and following substantially the same procedure described in Step B of Example 8, there is obtained (4-cyclopentaneacetyl-1-naphthyloxy) acetic acid.

Step B.—Preparation of [4-(α-cyclopentaneacryloyl)-1-naphthyloxy]acetic acid By replacing the (5-butyryl-1-naphthyloxy)acetic acid employed in Step E of Example 1 by an equivalent quantity of (4-cyclopentaneacetyl-1-naphthyloxy)acetic acid, and following substantially the same procedures described in Steps E and F of Example 1, there is obtained [4-(α-cyclopentaneacryloyl)-1-naphthyloxy]acetic acid.

EXAMPLE 46.—[4-(α-CYCLOHEXANEACRYLOYL)-1-NAPHTHYLOXY]ACETIC ACID

Step A.—Preparation of (4-cyclohexaneacetyl-1-naphthyloxy)acetic acid

By replacing the (2-methyl-1-naphthyloxy)acetic acid and the butyryl chloride employed in Example 8, Step B, by equivalent quantities of (1-naphthyloxy)acetic acid and cyclohexaneacetyl chloride respectively, and following substantially the same procedure described in Example 8, Step B, there is obtained (4-cyclohexaneacetyl-1-naphthyloxy)acetic acid.

Step B.—Preparation of [4-(α-cyclohexaneacryloyl)-1-naphthyloxy]acetic acid

By replacing the (5-butyryl-1-naphthyloxy)acetic acid employed in Example 1, Step E, by an equivalent quantity of (4-cyclohexaneacetyl-1-naphthyloxy)acetic acid, and following substantially the same procedures described in Example 1, Steps E and F, there is obtained [4-(α-cyclohexaneacryloyl)-1-naphthyloxy]acetic acid.

EXAMPLE 47.—[4-(α-METHYLENE-γ-PHENYLMERCAPTOBUTYRYL)-1-NAPHTHYLOXY]ACETIC ACID

Step A.—Preparation of [4-(γ-chlorobutyryl)-1-naphthyloxy]acetic acid

By replacing the (2-methyl-1-naphthyloxy)acetic acid and the butyryl chloride employed in Example 8, Step E, by equivalent quantities of (1-naphthyloxy)acetic acid and γ-chlorobutyryl chloride respectively, and following substantially the same procedure described in Step B of Example 8, there is obtained [4-(γ-chlorobutyryl)-1-naphthyloxy]acetic acid.

Step B.—Preparation of [4-(γ-phenylmercaptobutyryl)-1-naphthyloxy]acetic acid A solution of 2.2 ml. of thiophenol in 50 ml. of ethanol containing 1.12 g. of potassium hydroxide and 2.6 g. of [4-(γ-chlorobutyryl)-1-naphthyloxy]acetic acid is heated on a steam bath for 30 minutes, cooled and poured into 16 ml. of water. The solution is acidified with hydrochloric acid and the resulting product is extracted with ether. The ethereal extract is washed with water, dried over sodium sulfate, filtered and evaporated to dryness to give [4-(γ-phenylmercaptobutyryl)-1-napmthyloxy]acetic acid.

*Step C.—Preparation of [4-(α-methylene-γ-phenylmercaptobutyryl)-1-naphthyloxy]acetic acid*

By replacing the (5-butyryl-1-naphthyloxy)acetic acid employed in Step E of Example 1 by an equivalent quantity of [4-(γ-phenylmercaptobutyryl)-1-naphthyloxy]acetic acid and following substantially the same procedures described in Example 1, Steps E and F, there is obtained [4-(α-methylene-γ-phenylmercaptobutyryl) - 1 - naphthyloxy]acetic acid.

EXAMPLE 48.—[4-(α-BENZYLMERCAPTOACRYLOYL)-1-NAPHTHYLOXY]ACETIC ACID

*Step A.—Preparation of (4-chloroacetyl-1-naphthyloxy) acetic acid*

By replacing the (2-methyl-1-naphthyloxy)acetic acid and the butyryl chloride employed in Example 8, Step B, by equivalent quantities of (1-naphthyloxy)acetic acid chloroacetyl chloride respectively, and following substantially the same procedure described in Example 8, Step B, there is obtained (4-chloroacetyl-1-naphthyloxy)acetic acid.

*Step B.—Preparation of [4-benzylmercaptoacetyl-1-naphthyloxy]acetic acid*

By replacing the [4-(γ-chlorobutyryl)-1-naphthyloxy]acetic acid and the thiopenol employed in Example 47, Step B, by equivalent quantities of (4-chloroacetyl-1-naphthyloxy)acetic acid and benzylmercaptan respectively, and following substantially the same procedure described in Example 47, Step B, there is obtained (4-benzylmercaptoacetyl-1-naphthyloxy)acetic acid.

*Step C.—Preparation of [4-(α-benzylmercaptoacrylolyl)-1-naphthyloxy]acetic acid*

By replacing the (5-butyryl-1-naphthyloxy)acetic acid employed in Step E of Example 1 by an equivalent quantity of (4 - benzylmercaptoacetyl - 1 - naphthyloxy)acetic acid, and following substantially the same procedures described in Steps E and F of Example 1 there is obtained [4 - (α - benzylmercaptoacryloyl)-1-naphthyloxy]acetic acid.

EXAMPLE 49.—[4-(α-DIMETHYLAMINOMETHYLACRYLOYL)-1-NAPHTHYLOXY]ACETIC ACID HYDROCHLORIDE

A mixture of 0.02 mole of (4-acetyl-1-naphthyloxy)-acetic acid, prepared as described in Example 24, 0.045 mole of dimethylamine hydrochloride, 0.07 mole of paraformaldehyde and 10 ml. of glacial acetic acid is heated on a steam bath for 24 hours and then concentrated to dryness in vacuo to give [4 - (α - dimethylaminomethylacryloyl)-1-naphthyloxy]acetic acid hydrochloride.

EXAMPLE 50.—[4-(α-METHYLENE-β-TRIFLUOROMETHYLBUTYRYL) - 1 - NAPHTHYLOXY]-ACETIC ACID

*Step A.—Preparation of [4-(β-trifluoromethylbutyryl)-1-naphthyloxy]acetic acid*

Aluminum chloride (0.28 mole) is added portionwise over 45 minutes to a mixture of 0.093 mole of (1-naphthyloxy)acetic acid and 0.095 mole of β-trifluoromethylbutyryl chloride in 250 ml. of carbon disulfide cooled in an ice bath. The mixture is stirred at room temperature for 5 hours and allowed to stand at room temperature for an additional 18 hours. The reaction mixture then is worked up in substantially the same manner described in Example 8, Step B, to give [4-(β-trifluoromethylbutyryl)-1-naphthyloxy]acetic acid.

*Step B.—Preparation of [4-(α-methylene-β-trifluoromethylbutyryl)-1-naphthyloxy]acetic acid*

By replacing the (4-acetyl-1-naphthyloxy)acetic acid employed in Example 49 by an equivalent amount of [4 - (β-trifluoromethylbutyryl)-1-naphthyloxy]acetic acid and following substantially the same procedure described in Example 49, there is obtained [4-(α-methylene-β-trifluoromethylbutyryl)-1-naphthyloxy]acetic acid.

EXAMPLE 51.—[4-(α-PHENOXYACRYLOYL)-1-NAPHTHYLOXY]ACETIC ACID

*Step A.—Preparation of (4-phenoxyacetyl-1-naphthyloxy) acetic acid*

A solution of (4-chloroacetyl-1-naphthyloxy)acetic acid, prepared as described in Example 48, Step A (0.01 mole), and phenol (0.02 mole) in 50 ml. of water and 4 ml. of 20% aqueous sodium hydroxide is heated on the steam bath for one hour, cooled and acidified with hydrochloric acid to give (4-phenoxyacetyl-1-naphthyloxy)acetic acid.

*Step B.—Preparation of [4-(α-phenoxyacryloyl)-1-naphthyloxy]acetic acid*

A mixture of (4-phenoxyacetyl-1-naphthyloxy)acetic acid (0.022 mole), dimethylamine hydrochloride (1.8 g.), paraformaldehyde (1.5 g.), acetic acid (2 drops) and isopropyl alcohol (5 ml.) is heated on the steam bath for 2 hours. The mixture then is heated on the steam bath with 200 ml. of water and 25 ml. of saturated aqueous sodium bicarbonate for an additional 5 minutes, cooled acidified and extracted with benzene. The benzene extract is washed with water, dried over sodium sulfate, filtered and concentrated to give [4-(α-phenoxyacryloyl-1-naphthyloxy]acetic acid.

EXAMPLE 52.—α[4-α-METHYLENEBUTRYL)-1-NAPHTHYLOXY]ISOVALERIC ACID

*Step A.—Preparation of α-(4-butyryl-1-naphthyloxy) isovaleric acid*

By following substantially the same procedure described in Example 1, Step D, but replacing the 5-hydroxy-1-butyronaphthone and the ethyl bromoacetate by equimolecular quantities of 4-hydroxy-1-butyronaphthone and ethyl α-bromoisovalerate respectively, and following substantially the same procedure described in Step D of Example 1, there is obtained α-(4-butyryl-1-naphthyloxy) isovaleric acid.

*Step B.—Preparation of α-[4-(α-methylenebutyryl)-1-naphthyloxy]isovaleric acid*

By replacing the (5-butyryl-1-naphthyloxy)acetic acid employed in Step E of Example 1 by an equivalent quantity of α-(4-butyryl-1-naphthyloxy)isovaleric acid, and following substantially the same procedures described in Steps E and F of Example 1, there is obtained α-[4-(α-methylenebutyryl)-1-naphthyloxy]isovaleric acid.

EXAMPLE 53.—N-METHY-[4-(α-METHYLENEBUTYRYL)-1-NAPHTHYLOXY]ACETAMIDE

The above product is prepared following substantially the same procedure described in Example 32 but replacing the ammonia solution used in Example 32 by an equivalent quantity of methylamine, to yield N-methyl-[4-(α-methylenebutyryl)-1-naphthyloxy]acetamide.

EXAMPLE 54.—1-[(4-(α-METHYLENEBUTYRYL)-1-NAPHTHYLOXY)ACETYL]PIPERIDINE

By replacing the aqueous ammonia employed in Example 32 by an equivalent quantity of piperidine, and following substantially the same procedure described in Example 32, there is obtained 1-[(4-(α-methylenebutyryl)-1-naphthyloxy)-acetyl]piperidine.

EXAMPLE 55.—ETHYL [4 - [α - METHYLENE - γ-(4 - MORPHOLINYL) - BUTYRYL] - 1 - NAPHTHYLOXY]ACETATE

*Step A.—Preparation of ethyl [4-[γ-(4-morpholinyl)-butyryl]-1-naphthyloxy]acetate hydrochloride*

A solution of 0.02 mole of [4-(γ-chlorobutyryl)-1-naphthyloxy]acetic acid, prepared as described in Example 47, Step A, 50 mg. of potassium iodide, and 0.1 mole of morpholine in 30 ml. of benzene is heated under reflux for 24 hours, filtered and concentrated to dryness in vacuo. The residue is heated under reflux for 2 hours with 50 ml. of 30% alcoholic hydrogen chloride and the solution concentrated to dryness in vacuo. Aqueous sodium bicarbonate is added and the mixture extracted with ether. The ethereal extract is washed with water, dried over sodium sulfate, filtered and evaporated to dryness on the steam bath. The residue is treated with alcoholic hydrogen chloride to give ethyl [4-[γ-(4-morpholinyl)-butyryl]-1-naphthyloxy]acetate hydrochloride.

*Step B.—Preparation of ethyl [4-[α-methylene-γ-(4-morpholinyl)-butyryl]-1-naphthyloxy]acetate*

By replacing the (5-butyryl-1-naphthyloxy)acetic acid employed in Example 1, Step E, by an equivalent quantity of ethyl [4-[γ-(4-morpholinyl)-butyryl]-1-naphthyloxy]acetate hydrochloride and following substantially the same procedures described in Example 1, Steps E and F, there is obtained ethyl [4 - (α - methylene - γ - (morpholinyl)-butyryl]-1-naphthyloxy]acetate.

EXAMPLE 56.—[4-(α-ISOBUTYLIDENEPROPIONYL)-1-NAPHTHYLOXY]ACETIC ACID

By replacing the [4-(α-methyleneisovaleryl)-1-naphthyloxy]acetic acid employed in Example 38, Step A, by an equivalent quantity of [4-(α-methyleneisocaproyl)-1-naphthyloxy]acetic acid prepared as described in Example 42, and following substantially the same procedure described in Example 38, Steps A through C, there is obtained [4 - (α - isobutylidenepropionyl)-1-naphthyloxy]-acetic acid.

EXAMPLE 57.—[4-(α-PROPYLIDENEVALERYL)-1-NAPHTHYLOXY]ACETIC ACID

*Step A.—Preparation of [4-(α-propylvaleryl)-1-naphthyloxy]acetic acid*

By replacing the (2-methyl-1-naphthyloxy)acetic acid and the butyryl chloride employed in Step B of Example 8 by equimolecular quantities of 1-naphthyloxyacetic acid and α-propylvaleryl chloride respectively, and following substantially the same procedure described in Example 8, Step B, there is obtained [4-(α-propylvaleryl)-1-naphthyloxy]acetic acid.

*Step B.—Preparation of [4-(α-propyl-α-bromovaleryl)-1-naphthyloxy]acetic acid*

To a solution of [4-(α-propylvaleryl)-1-naphthyloxy]acetic acid (0.0374 mole) in 200 ml. of acetic acid is added with stirring two drops of 48% hydrobromic acid followed by the dropwise addition of bromine (0.0374 mole) in 50 ml. of acetic acid. After the addition is completed, the mixture is stirred for 15 minutes and then poured into 1 liter of water containing 2 g. of sodium bisulfite. The solid that separates is collected on a filter, washed with water, and dried in air to give [4-(α-propyl-α-bromovaleryl)-1-naphthyloxy]acetic acid.

*Step C.—Preparation of [4-(α-propylidenevaleryl)-1-naphthyloxy]acetic acid*

The bromo ketone prepared as described in Step B (0.0185 mole) is dissolved in 400 ml. of hot benzene. Powdered silver acetate (0.024 mole) is added slowly with mechanical stirring. The mixture is heated for about 5½ hours and then acidified with 6 N hydrochloric acid. The silver salts that form are removed by filtration, the benzene layer separated and 2 g. of decolorizing charcoal are added thereto and the mixture then kept at 25–30° C. for 48 hours. The solution then is filtered, diluted with ether and extracted with 5% sodium bicarbonate solution. The aqueous extract is treated with decolorizing charcoal and acidified to give [4-(α-propylidenevaleryl)-1-naphthyloxy]acetic acid.

EXAMPLE 58.—[4 - [α - (CARBOXYMETHYLMERCAPTOMETHYL) - BUTYRYL] - 1 - NAPHTHYLOXY]ACETIC ACID

Equimolecular amounts of [4 - (α - methylenebutyryl)-1-naphthyloxy]acetic acid, prepared as described in Example 11, and thioglycolic acid are heated on a steam bath for about 5 minutes. The product that forms on cooling is [4 - [α - (carboxymethylmercaptomethyl) - butyryl]-1-naphthyloxy]acetic acid.

EXAMPLE 59.—[4-(β-METHYLACRYLOYL)-1-NAPHTHYLOXY]ACETIC ACID

A solution of [4-(β-chlorobutyryl)-1-naphthyloxy]-acetic acid, prepared as described in Example 40, Step A, in 10 ml. of methanol containing 0.015 mole of freshly fused potassium acetate is allowed to stand at room temperature for 5 hours and then concentrated to dryness in vacuo at room temperature. The residue is dissolved in water, acidified with dilute hydrochloric acid and the product extracted with ether. The ethereal extract is washed with water, dried over sodium sulfate, filtered and evaporated to dryness on the steam bath to give [4-(β-methylacryloyl)-1-naphthyloxy]acetic acid

EXAMPLE 60.—SODIUM SALT OF [4-(α-METHYLENEBUTYRYL) - 1 - NAPHTHYLOXY]ACETIC ACID

An aqueous solution of [4-(α-methylenebutyryl)-1-naphthyloxy]acetic acid, prepared as described in Example 11, is exactly neutralized by an aqueous solution of sodium hydroxide. The solution then is lyophilized to give the sodium salt of [4-(α-methylenebutyryl)-1-naphthyloxy]acetic acid in the form of a white powder.

Suitable dosage forms of the products of this invention can be prepared as described below or by other known methods for administration in the treatment of conditions resulting from an excessively high concentration of electrolytes in the body or an excessively high retention of fluid in the body such as in the treatment of edematous conditions resulting, for example from congestive heart failure. It will be appreciated that the dosage of the novel compounds of this invention will vary over a wide range depending upon the age and weight of the patient to be treated, upon the particular ailment to be treated and the relative potency of the selected diuretic agent. For these reasons, tablets, pills, capsules and the like, containing, for example, 25, 50, 100, 150, 250, 500 mg. or more of active ingredient can be made available to the physician for the symptomatic adjustment of the dosage to the individual patient.

A suitable unit dosage form of the products of this invention can be prepared by mixing 50 mg. of the naphthyloxyacetic acid such as [4-(α-methylenebutyryl)-1-naphthyloxy]acetic acid with 150 mg. of lactose and placing the 200 mg. of mixture into a No. 3 gelatin capsule. Similarly by employing more of the active ingredient and less lactose, other dosage forms can be put up in No. 3 gelatin capsules, and should it be necessary to mix more than 200 mg. of ingredients together, larger capsules can be employed. Compressed tablets, pills, or other desired unit dosages can be prepared to incorporate the naphthyloxyacetic acid compounds of this invention by conventional methods, and, if desired, the product can be made up as elixirs or as injectable solutions by methods well known to pharmacists. It is also contemplated to combine two or more of the compounds of this invention in a unit dosage form or to combine one or more of the compounds with other known diuretic agents or hypotensive agents or with other desired therapeutic and/or nutritive agents in dosage unit form.

While the preceding examples describe the preparation of certain compounds which are illustrative of compounds of this invention and certain dosage forms which are suitable for administering the novel compounds, it is to be understood that the invention is not to be limited by these examples or by the specific methods described for the preparation of the compounds or by the specific unit dosage forms described, but is to be understood to embrace variations and modifications thereof which fall within the scope of the appended claims.

What is claimed is:

1. Compounds having the structural formula

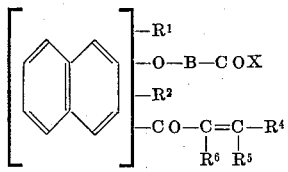

wherein $R^1$ and $R^2$ respectively is selected from the group consisting of hydrogen, lower alkyl and halogen; at least one of $R^4$, $R^5$ and $R^6$ represents a group other than hydrogen and wherein $R^4$, $R^5$ and $R^6$ respectively is selected from the group consisting of hydrogen, halogen, hydroxyl, lower alkyl, carboxy-lower alkyl, mononuclear arylthio-lower alkyl, mononuclear aryl-lower alkylthio, amino-lower alkyl, halo-lower alkyl, lower cycloalkyl, mononuclear aryl, alkyl substituted mononuclear aryl, lower alkoxy substituted mononuclear aryl, lower alkylthio substituted mononuclear aryl, hydroxy substituted mononuclear aryl, halo substituted mononuclear aryl, mononuclear aryl-lower-alkyl, mononuclear aryloxy, morpholinyl-lower-alkyl and $R^4$ and $R^6$ additionally can be joined together to form with the carbon atoms to which they are attached a 3 to 6 membered carbon ring;

B is selected from the group consisting of divalent lower-alkylene, divalent mononuclear-arylene, and divalent lower-alkyl-mononuclear-arylene;

X is selected from the group consisting of hydroxyl and alkali metal and alkaline earth metal salts thereof, alkoxyl, dialkylamino substituted alkoxyl, an amino group of the formula $-NR^7R^8$ wherein $R^7$ and $R^8$ are similar or dissimilar members selected from hydrogen, alkyl and, taken together with the nitrogen atom to which they are attached, piperidino.

2. Compounds having the structural formula

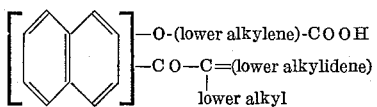

3. Compounds having the structural formula

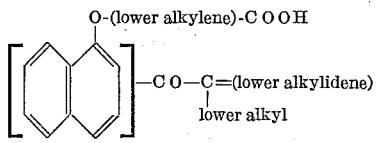

4. Compounds having the structural formula

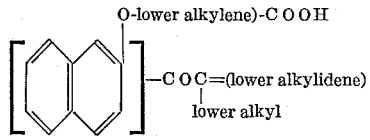

5. [4 - (α - methylenebutyryl) - 1 - naphthyloxy]acetic acid.

6. [4 - (α - ethylidenebutyryl) - 1 - naphthyloxy]acetic acid.

7. (4-methacryloyl-1-naphthyloxy)acetic acid.

8. Compounds having the structural formula

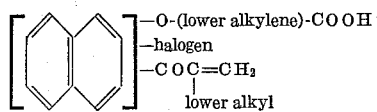

9. Compounds having the structural formula

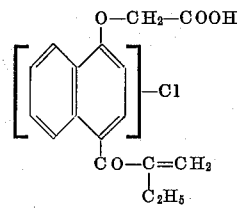

10. [2 - chloro - 4 - (α - methylenebutyryl) - 1 - naphthyloxy]acetic acid.

11. Compounds having the structural formula

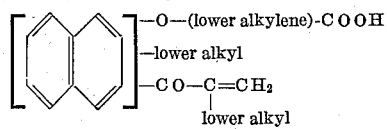

12. Compounds having the structural formula

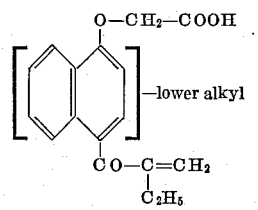

13. [2 - methyl - 4 - (α - methylenebutyryl) - 1 - naphthyloxy]acetic acid.

14. [3 - methyl - 4 - (α - methylenebutyryl) - 1 - naphthyloxy]acetic acid.

15. [5 - methyl - 4 - (α - methylenebutyryl) - 1 - naphthyloxy]acetic acid.

16. Compounds having the structural formula

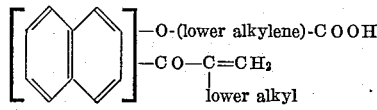

17. Compounds having the structural formula

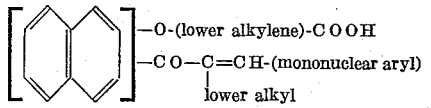

18. Compounds having the structural formula

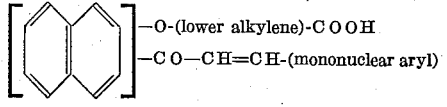

References Cited by the Examiner

Elseviers Ency. Org. Chem., vol. 12B, Napthalene Hydroxy Compounds, pp. 1201 and 1290 (1950).

LORRAINE A. WEINBERGER, *Primary Examiner.*

S. B. WILLIAMS, *Assistant Examiner.*